(12) United States Patent
Sato et al.

(10) Patent No.: US 11,481,692 B2
(45) Date of Patent: Oct. 25, 2022

(54) MACHINE LEARNING PROGRAM VERIFICATION APPARATUS AND MACHINE LEARNING PROGRAM VERIFICATION METHOD

(71) Applicant: HITACHI, LTD., Tokyo (JP)

(72) Inventors: Naoto Sato, Tokyo (JP); Yuichiroh Nakagawa, Tokyo (JP); Hironobu Kuruma, Tokyo (JP); Hideto Noguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 413 days.

(21) Appl. No.: 16/784,450

(22) Filed: Feb. 7, 2020

(65) Prior Publication Data
US 2020/0265342 A1    Aug. 20, 2020

(30) Foreign Application Priority Data
Feb. 15, 2019   (JP) .............................. JP2019-025171

(51) Int. Cl.
*G06N 20/20* (2019.01)
*G06N 5/00* (2006.01)

(52) U.S. Cl.
CPC .............. *G06N 20/20* (2019.01); *G06N 5/003* (2013.01)

(58) Field of Classification Search
None
See application file for complete search history.

(56) References Cited

U.S. PATENT DOCUMENTS

| | | | |
|---|---|---|---|
| 10,049,302 B1 * | 8/2018 | Liu .................... | G06N 20/10 |
| 2015/0379425 A1 * | 12/2015 | Dirac .................. | G06N 20/00 706/12 |
| 2016/0125299 A1 * | 5/2016 | Lee .................... | G06N 20/00 706/12 |
| 2020/0005183 A1 * | 1/2020 | Tanimoto ............ | G06N 20/00 |
| 2020/0250623 A1 * | 8/2020 | Duan .................. | G06N 20/00 |
| 2020/0387832 A1 * | 12/2020 | Jordan ................ | G06N 20/20 |
| 2021/0012214 A1 * | 1/2021 | Nakanoya ........... | G06N 20/00 |

FOREIGN PATENT DOCUMENTS

| | | | | |
|---|---|---|---|---|
| CN | 106022350 A | * | 10/2016 | ............ G06N 5/045 |
| EP | 3076357 A1 | * | 10/2016 | ............ G06N 5/045 |
| JP | 2018-045516 A | | 3/2018 | |
| WO | WO-2016004075 A1 | * | 1/2016 | ........... G06F 9/5066 |

* cited by examiner

*Primary Examiner* — Insun Kang
(74) *Attorney, Agent, or Firm* — Mattingly & Malur, PC

(57) ABSTRACT

A validity of a prediction model can be evaluated comprehensively. A machine learning program verification apparatus 100 includes a calculation device 104. The calculation device 104 obtains a decision tree logical expression by logically combining path logical expressions indicating decision tree paths indecision trees for a program created by machine learning, creates a combined logical expression by logically combining a verification property logical expression and an objective variable calculation logical expression with the decision tree logical expression, performs satisfiability determination by inputting the combined logical expression to a satisfiability determiner, and when a result of the determination indicates satisfaction, obtains, from a satisfaction solution of the satisfiability determination, a violation input value that is a value of an explanatory variable that violates a verification property and a violation output value that is a value of an objective variable.

15 Claims, 21 Drawing Sheets

DATA SET

| PRODUCT NAME | PRICE (¥) | INVENTORY | NUMBER OF SALES (MONTHLY) |
|---|---|---|---|
| A | 180 | 1500 | 245 |
| ... | ... | ... | ... |

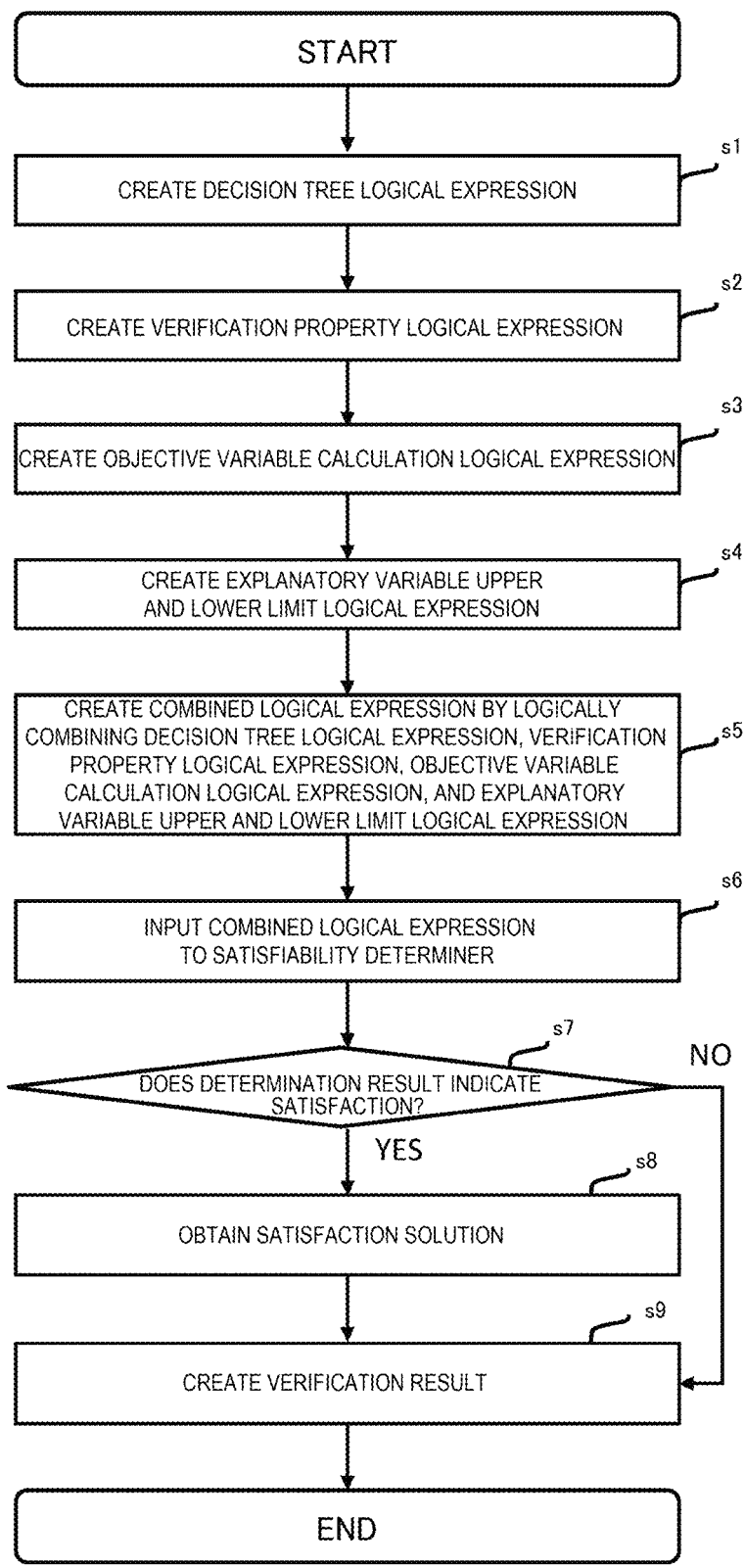

FIG. 6
EXAMPLE OF DECISION TREE LOGICAL EXPRESSION

1101

$(x0>250 \rightarrow leaf0 = 15) \wedge$
$((\neg(x0>250) \wedge x1>3) \rightarrow leaf0 = 40) \wedge$
$((\neg(x0>250) \wedge \neg(x1>3)) \rightarrow leaf0 = 30) \wedge$
$((x2 > 15 \wedge x3 > 4.0) \rightarrow leaf1 = 20) \wedge$
$((x2 > 15 \wedge \neg(x3 > 4.0)) \rightarrow leaf1 = 10) \wedge$
$(\neg(x2 > 15) \rightarrow leaf1 = 5)$

FIG. 7
EXAMPLE OF VERIFICATION PROPERTY LOGICAL EXPRESSION

1111

$\neg(x0 > 300 \rightarrow x2 * 2 > y)$

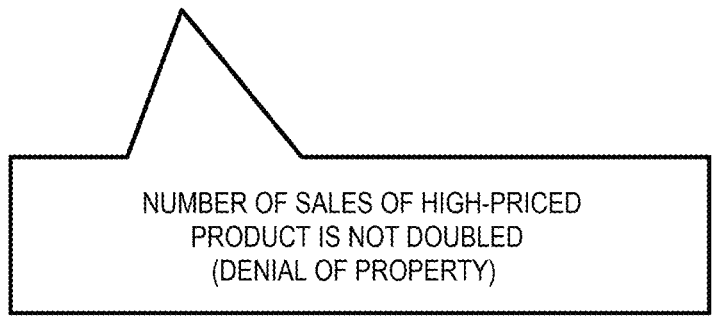

NUMBER OF SALES OF HIGH-PRICED
PRODUCT IS NOT DOUBLED
(DENIAL OF PROPERTY)

FIG. 8
EXAMPLE OF OBJECTIVE VARIABLE CALCULATION LOGICAL EXPRESSION

1121

$(leaf0 + leaf1) = y$

FIG. 9
EXAMPLE OF EXPLANATORY VARIABLE UPPER AND LOWER LIMIT LOGICAL EXPRESSION

1131

$x0 \geq 1 \wedge x0 \leq 1000 \wedge$
$x1 \geq 0 \wedge x1 \leq 10 \wedge$
$x2 \geq 0 \wedge x2 \leq 300 \wedge$
$x3 \geq 0.0 \wedge x3 \leq 5.0$

FIG. 10
EXAMPLE OF COMBINED LOGICAL EXPRESSION $(x0 > 250 \rightarrow leaf0 = 15) \wedge$
$((\neg(x0 > 250) \wedge x1 > 3) \rightarrow leaf0 = 40) \wedge$
$((\neg(x0 > 250) \wedge \neg(x1 > 3)) \rightarrow leaf0 = 30) \wedge$
$((x2 > 15 \wedge x3 > 4.0) \rightarrow leaf1 = 20) \wedge$
$((x2 > 15 \wedge \neg(x3 > 4.0)) \rightarrow leaf1 = 10) \wedge$
$(\neg(x2 > 15) \rightarrow leaf1 = 5) \wedge$
$\neg(x0 > 300 \rightarrow x2 * 2 > y) \wedge$
$(leaf0 + leaf1) = y \wedge$
$x0 \geq 1 \wedge x0 \leq 1000 \wedge$
$x1 \geq 0 \wedge x1 \leq 10 \wedge$
$x2 \geq 0 \wedge x2 \leq 300 \wedge$
$x3 \geq 0.0 \wedge x3 \leq 5.0$

1141

FIG. 11
VERIFICATION RESULT EXAMPLE 1

1152

- EXISTENCE OF VIOLATION: VIOLATION
- VIOLATION INPUT VALUE AND VIOLATION OUTPUT VALUE:

| x0  | x1 | x2 | x3  | y  |
|-----|----|----|-----|----|
| 301 | 0  | 16 | 5.0 | 35 |

FIG. 12
VERIFICATION RESULT EXAMPLE 2

1152

- EXISTENCE OF VIOLATION: NO VIOLATION

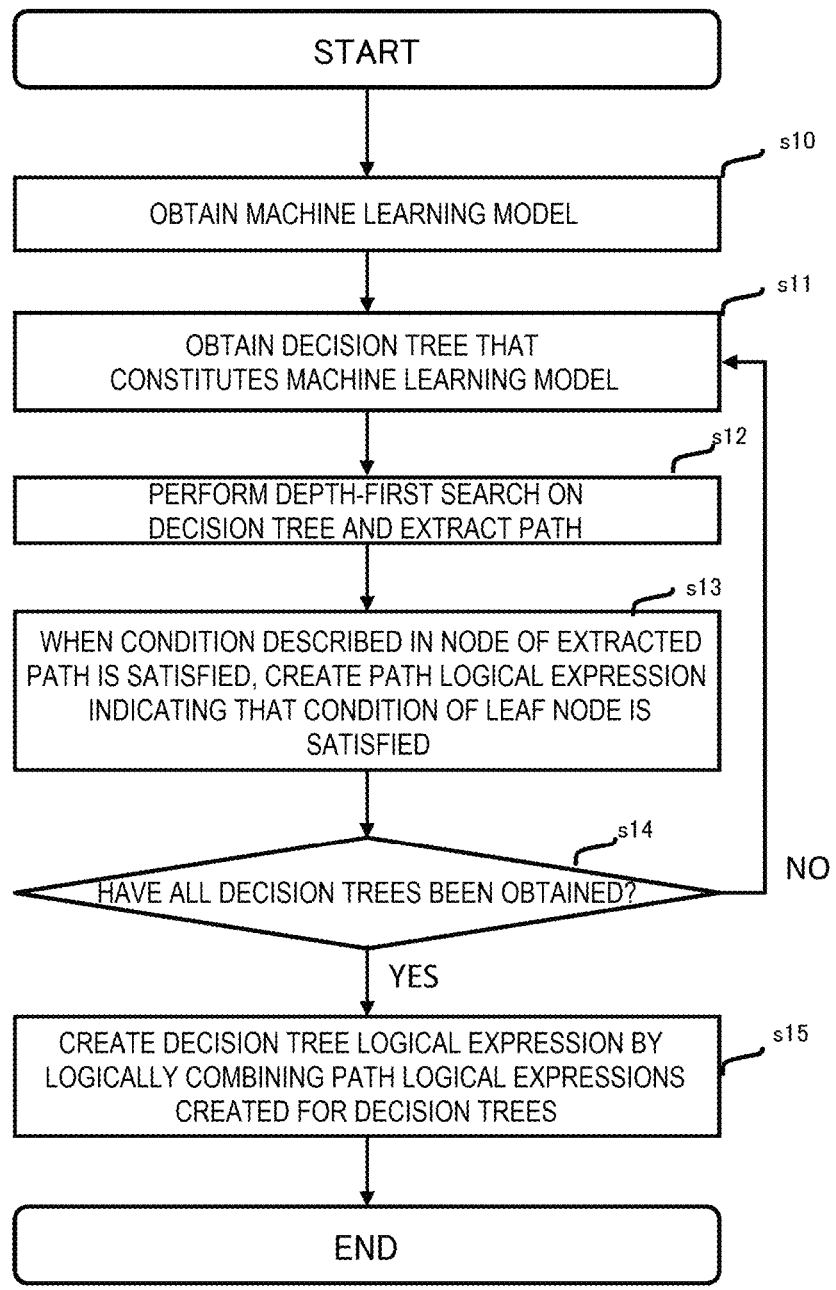

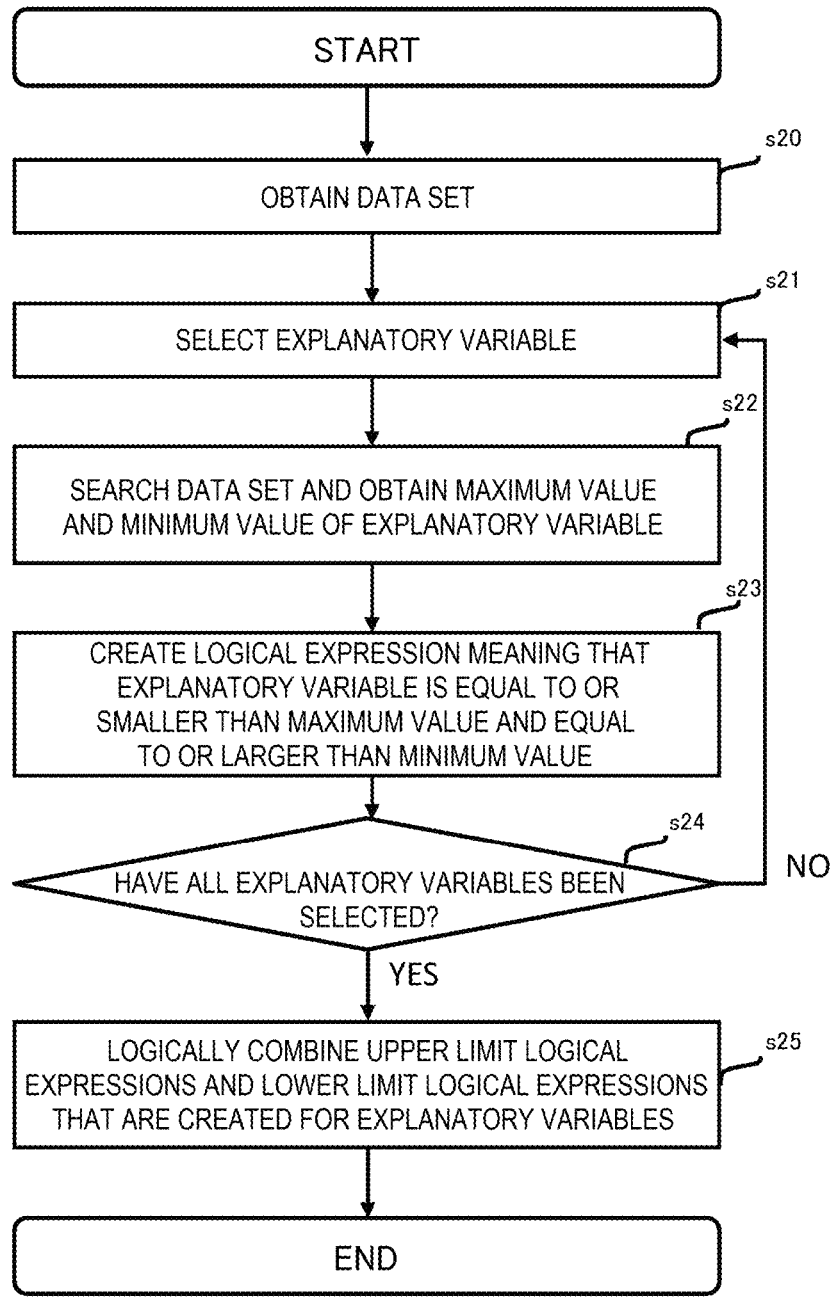

FIG. 17
EXAMPLE OF VIOLATION INPUT VALUE AND OUTPUT VALUE

| # | x0 | x1 | x2 | x3 | y |
|---|-----|----|----|-----|----|
| 1 | 301 | 0 | 16 | 5.0 | 35 |
| 2 | 311 | 0 | 16 | 5.0 | 35 |
| 3 | 301 | 1 | 16 | 5.0 | 35 |
| 4 | 301 | 0 | 17 | 5.0 | 35 |

1271

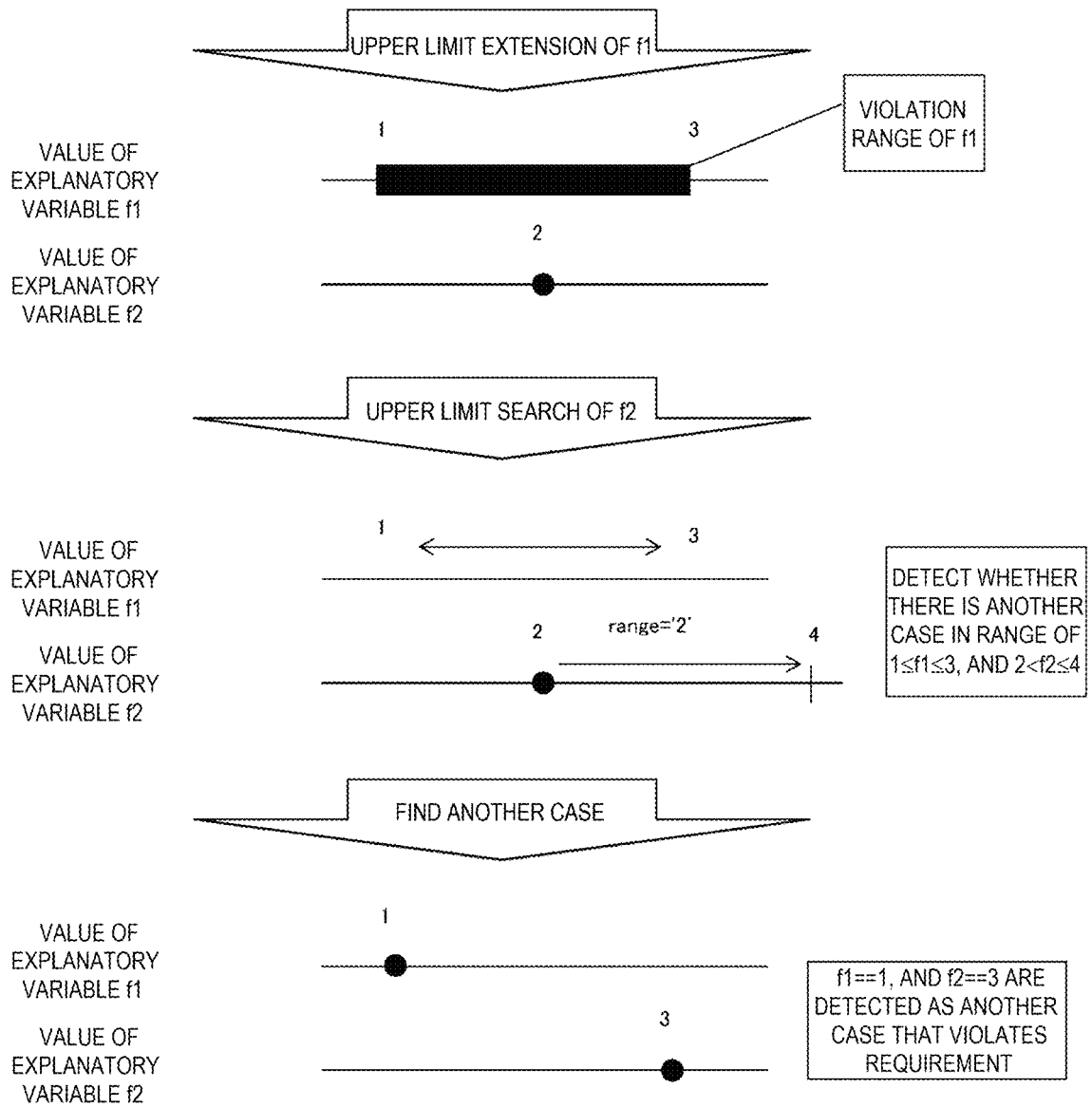

EXAMPLE OF VIOLATION RANGE
                                                                    1281

| # | x0 | x1 | x2 | x3 |
|---|---|---|---|---|
| 1 | 301≦x0 ≦1000 | 0≦x1 ≦10 | 16≦x2 ≦17 | 4.1≦x3 ≦5.0 |
| 2 | 301≦x0 ≦1000 | 0≦x1 ≦10 | 0≦x2 ≦10 | 0.0≦x3 ≦5.0 |

VIOLATION PATH DISPLAY UNIT

DISPLAY EXAMPLE OF VIOLATION PATH

EXAMPLE IN WHICH HIGHLIGHTED PATH BRANCHES IN NODE

EXAMPLE OF SOURCE CODE OF INPUT FILTER     1201

```
def filter(x0, x1, x2, x3):
    if x0 >= 301 && x0 <= 1000 &&
       x1 >= 0 && x1 <= 10 &&
       x2 >= 16 && x2 <= 17 &&
       x3 >= 4.1 && x3<= 5.0 :
       return False
    elif x0 >= 301 && x0 <= 1000 &&
       x1 >= 0 && x1 <= 10 &&
       x2 >= 0 && x2 <= 10 &&
       x3 >= 0.0 && x3<= 5.0 :
       return False
    else:
       return True
```

MACHINE LEARNING PROGRAM VERIFICATION APPARATUS AND MACHINE LEARNING PROGRAM VERIFICATION METHOD

CROSS-REFERENCE TO RELATED APPLICATION

The present application claims priority from Japanese application JP 2019-025171, filed on Feb. 15, 2019, the contents of which is hereby incorporated by reference into this application.

BACKGROUND OF THE INVENTION

1. Field of the Invention

The present invention relates to a machine learning program verification apparatus and a machine learning program verification method, and specifically relates to a technology that enables comprehensive evaluation of validity of a prediction model.

2. Description of the Related Art

In recent years, machine learning methods using a decision tree such as a random forest or a gradient boost have been proposed. In these methods, a program representing a plurality of decision trees is created by training.

The program created in this manner is referred to as a prediction (more accurately, classification or regression) model. In the prediction model, input values are analyzed with various decision trees, and a final output value (predicted value) is created by combining obtained analysis results.

On the other hand, there is a technology in the related art for evaluating validity of a prediction model including a plurality of decision trees as described above. For example, a classification apparatus (see JP-A-2018-45516) or the like has been proposed. The classification apparatus includes a branch evaluation unit configured to calculate an evaluation value of each branch in a classification model of a tree structure used for classification of classification target data; a classification unit configured to classify the classification target data by using the classification model of the tree structure to obtain a classification result; and a classification result evaluation unit configured to calculate, based on the evaluation value of a branch from a node included in a path on the classification model of the tree structure in the classification performed by the classification unit, an evaluation value related to the classification performed by the classification unit.

SUMMARY OF THE INVENTION

When the number of decision trees in the prediction model is small, logic of the prediction model is visualized, and the logic is visually confirmed by a user, whereby the validity of the prediction model can be easily evaluated. In the related art, the validity of the prediction model can be evaluated (evaluation using an information gain as an index) for a tested input value.

However, in order to obtain practical generalization performance in the prediction model, it is necessary to create a large number of decision trees. In this case, even when the user makes the visual confirmation as described above, it is difficult to evaluate the validity within a practical range in terms of time and a cost.

On the other hand, even when a technology such as the related art is adopted, if an input value space of the prediction model is enormous, not all input values can be tested within a limited development period. In this case, the prediction model is installed in a system and shipped without performing the evaluation on the untested input value. As a result, a serious problem may occur in the system.

Accordingly, an object of the invention is to provide a technology that enables comprehensive evaluation of validity of a prediction model.

An aspect of the invention provides a machine learning program verification apparatus. The machine learning program verification apparatus includes: a storage device in which a program is stored, the program being created by machine learning, in which a value of an objective variable is output with a value of an explanatory variable as an input, in accordance with a prediction algorithm based on an ensemble tree including a plurality of decision trees; and a calculation device configured to: create a decision tree logical expression by logically combining path logical expressions indicating decision tree paths in the decision trees for the program; create a combined logical expression by logically combining a verification property logical expression and an objective variable calculation logical expression with the decision tree logical expression, the verification property logical expression indicating a verification property to be verified for the program, and the objective variable calculation logical expression defining a relationship between a decision tree output value of each decision tree and the value of the objective variable; obtain a satisfiability determination result of the combined logical expression by inputting the combined logical expression to a predetermined satisfiability determiner, and determine, based on the satisfiability determination result, whether the program satisfies the verification property; and when a result of the determination indicates satisfaction, obtain, from a satisfaction solution indicated by the satisfiability determiner, a violation input value that is a value of an explanatory variable that violates the verification property and a violation output value that is a value of an objective variable corresponding to the violation input value.

An aspect of the invention provides a machine learning program verification method. The machine learning program verification method to be executed by an information processing apparatus including a storage device in which a program is stored, the program being created by machine learning, in which a value of an objective variable is output with a value of an explanatory variable as an input, in accordance with a prediction algorithm based on an ensemble tree including a plurality of decision trees, and the method includes: creating a decision tree logical expression by logically combining path logical expressions indicating decision tree paths in the decision trees for the program; creating a combined logical expression by logically combining a verification property logical expression and an objective variable calculation logical expression with the decision tree logical expression, the verification property logical expression indicating a verification property to be verified for the program, and the objective variable calculation logical expression defining a relationship between a decision tree output value of each decision tree and the value of the objective variable; obtaining a satisfiability determination result of the combined logical expression by inputting the combined logical expression to a predetermined satisfiability determiner, and determining, based on the satisfiability determination result, whether the program satisfies the verification property; and when a result of the determination indicates satisfaction, obtaining, from a satisfaction solution indicated by the satisfiability determiner, a violation input value that is a value of an explanatory variable that violates the verification property and a violation output value that is a value of an objective variable corresponding to the violation input value.

According to the invention, the validity of the prediction model can be evaluated comprehensively.

BRIEF DESCRIPTION OF THE DRAWINGS

FIG. 5 is a flowchart showing a flow example 1 of a machine learning program verification method according to the present embodiment.

FIG. 6 is a diagram showing an example of a decision tree logical expression according to the present embodiment.

FIG. 7 is a diagram showing an example of a verification property logical expression according to the present embodiment.

FIG. 8 is a diagram showing an example of an objective variable calculation logical expression according to the present embodiment.

FIG. 9 is a diagram showing an example of an explanatory variable upper and lower limit logical expression according to the present embodiment.

FIG. 10 is a diagram showing an example of a combined logical expression according to the present embodiment.

FIG. 11 is a diagram showing a verification result example 1 according to the present embodiment.

FIG. 12 is a diagram showing a verification result example 2 according to the present embodiment.

FIG. 13 is a flowchart showing a flow example 2 of the machine learning program verification method according to the present embodiment.

FIG. 14 is a flowchart showing a flow example 3 of the machine learning program verification method according to the present embodiment.

FIG. 17 is a table showing an example of a violation input value and output value according to the present embodiment.

FIG. 18B is a diagram showing a conceptual example 2 of the violation range search according to the present embodiment.

DESCRIPTION OF THE PREFERRED EMBODIMENTS

<Apparatus Configuration>

Figure 1:
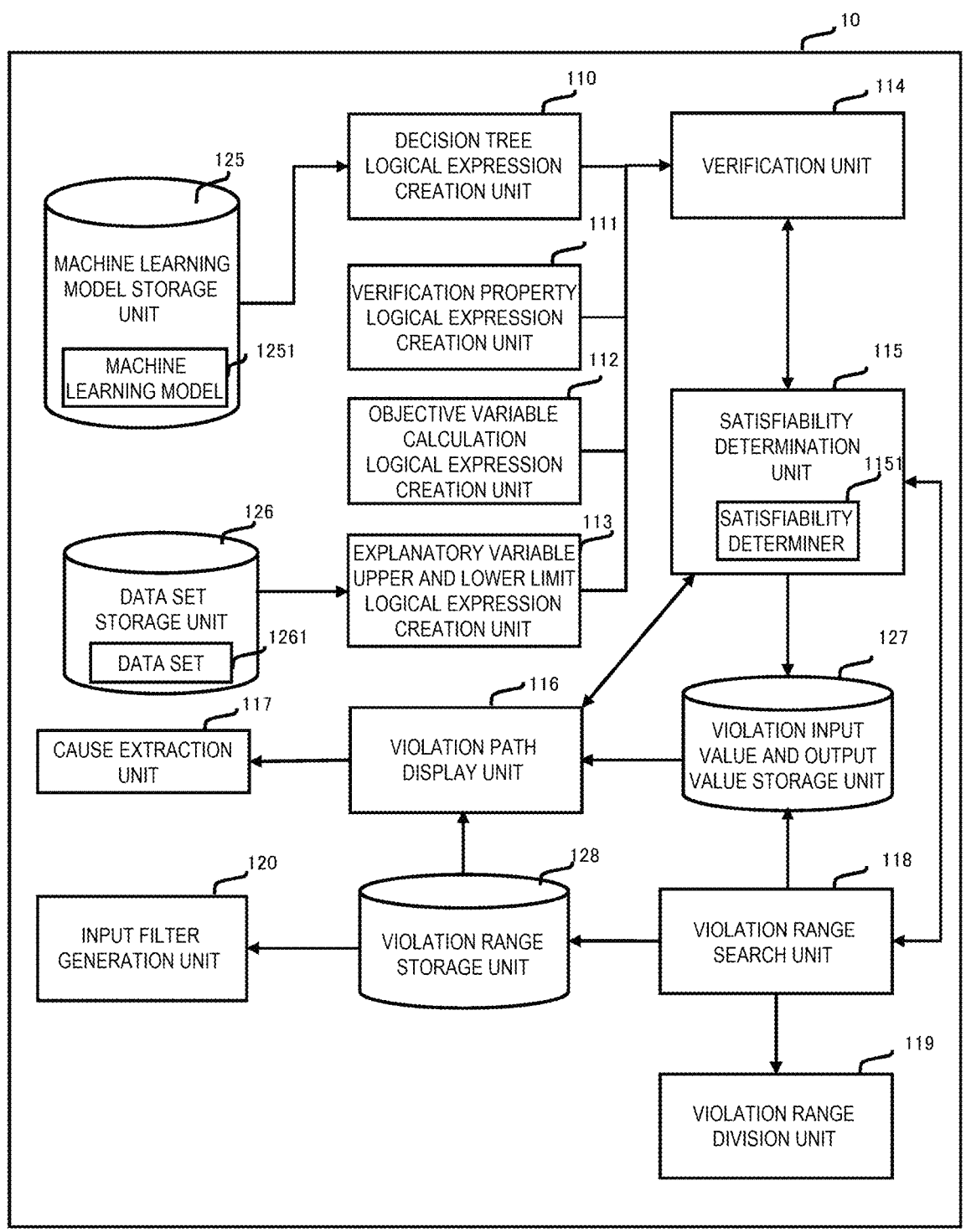
FIG. 1 is a configuration diagram of a machine learning program verification apparatus according to the present embodiment.

Hereinafter, embodiments of the invention will be described in detail with reference to the accompanying drawings. FIG. 1 is a diagram of a network configuration including a machine learning program verification apparatus 100 of the present embodiment. The machine learning program verification apparatus 100 shown in FIG. 1 is a computer apparatus that can comprehensively evaluate validity of a prediction model. According to such a machine learning program verification apparatus 100, even when a large number of decision trees are processing targets, verification processing is completed within a realistic time. On the other hand, in the related art or the like, in a present situation where a unit time for specifying violation points one by one is at least a few seconds and a long unit time takes one hour, when a large number of decision trees are processing targets, it is impossible to complete the processing within a very realistic time, considering that it is not uncommon for the violation points to exist in unit of a hundred million.

Here, a machine learning program is a program created by machine learning in which a value of an objective variable is output with a value of an explanatory variable as an input in accordance with a prediction algorithm based on an ensemble tree including a plurality of decision trees. In the present embodiment, the machine learning program is referred to as a machine learning model 1251.

The machine learning program verification apparatus 100 is assumed to be, for example, an information processing apparatus operated by an operator who is responsible for development and operation of the machine learning model 1251. Further, the machine learning model 1251 can assume, based on business data such as a past sales track record, for example, a model that predicts a sales quantity of a product and price setting based on the sales quantity (of course, not limited thereto).

As shown in FIG. 1, such a machine learning program verification apparatus 100 includes functional units such as a decision tree logical expression creation unit 110, a verification property logical expression creation unit 111, an objective variable calculation logical expression creation unit 112, an explanatory variable upper and lower limit logical expression creation unit 113, a verification unit 114, a satisfiability determination unit 115, a violation path display unit 116, a cause extraction unit 117, a violation range search unit 118, a violation range division unit 119, and an input filter generation unit 120.

Among the above units, the decision tree logical expression creation unit 110 creates a decision tree logical expression by logically combining path logical expressions indicating decision tree paths in the decision trees for the machine learning model 1251 (to be described below). In this case, the decision tree logical expression creation unit 110 extracts a decision tree path from the decision tree, and creates a path logical expression including a path condition of the extracted decision tree path.

The verification property logical expression creation unit 111 receives, by an input device 105 (FIG. 2), a user input of a verification property defined as a relationship between the explanatory variable and the objective variable in the machine learning model 1251, and creates a verification property logical expression based on the verification property received here.

The objective variable calculation logical expression creation unit 112 creates an objective variable calculation logical expression based on a relationship between a decision tree output value created for each decision tree and the value of the objective variable in accordance with an algorithm of the decision tree.

The explanatory variable upper and lower limit logical expression creation unit 113, for example, refers to a data set 1261 (FIG. 1), specifies a maximum value and a minimum value of the explanatory variable such as a product price as an upper limit value and a lower limit value of the explanatory variable, and generates, by a processing algorithm, a logical expression in which the upper limit value and the lower limit value are described.

The verification unit 114 logically combines the verification property logical expression and the objective variable calculation logical expression with the decision tree logical expression to create a combined logical expression.

During the creation of the combined logical expression, it is preferable that the verification unit 114 obtains the maximum value and the minimum value of the explanatory variable by referring to the data set 1261, creates the explanatory variable range limit logical expression indicating that the value of the explanatory variable is equal to or smaller than the maximum value and equal to or larger than the minimum value, and creates the combined logical expression by logically combining the explanatory variable range limit logical expression with the decision tree logical expression, the verification property logical expression, and the objective variable calculation logical expression. Such a method for creating the combined logical expression can also be similarly applied to a case where a combined logic expression is created in the violation range search unit 118.

The satisfiability determination unit 115 obtains a satisfiability determination result of the combined logical expression by inputting the combined logical expression to a satisfiability determiner 1151, and determines, based on the satisfiability determination result, whether the machine learning model 1251 satisfies the verification property. Further, when the determination result indicates satisfaction, the satisfiability determination unit 115 obtains, from a satisfaction solution indicated by the satisfiability determiner 1151, (i) a violation input value that is a value of the explanatory variable that violates the verification property and (ii) a violation output value that is a value of the objective variable corresponding to the violation input value, and stores the violation input value and the violation output value in a violation input value and output value storage unit 127.

The violation path display unit 116 creates a violation input value designation logical expression meaning that the value of the explanatory variable that appears in the path logical expression matches the violation input value or a second violation input value, and creates a violation input value-designated path logical expression by logically combining the violation input value designation logical expression with the path logical expression.

The violation path display unit 116 obtains a satisfiability determination result of the violation input value-designated path logical expression by inputting the violation input value-designated path logical expression to the satisfiability determiner 1151, and when the satisfiability determination result indicates satisfaction, obtains the corresponding decision tree path as a violation path.

The violation path display unit 116 displays the decision tree as a decision tree graph on a screen of a display device 106 (FIG. 2), and highlights the violation path on the decision tree graph.

The violation path display unit 116 creates a violation range designation logical expression indicating that the value of the explanatory variable that appears in the path logical expression is included in a violation range, and creates a violation range designation path logical expression by logically combining the violation range designation logical expression with the path logical expression.

The violation path display unit 116 obtains a satisfiability determination result of the violation range designation path logical expression by inputting the violation range designation path logical expression to the satisfiability determiner 1151, and when the satisfiability determination result indicates satisfaction, obtains the corresponding decision tree path as a violation path.

The violation path display unit 116 displays the decision tree as the decision tree graph on the screen of the display device 106, and highlights the violation path on the decision tree graph.

The cause extraction unit 117 highlights the violation path on the decision tree graph for the violation input value or the second violation input value, and obtains, among nodes that constitute the decision tree graph, a node in which the highlighted violation path does not branch as a non-branching node.

The cause extraction unit 117 outputs the explanatory variable used in the non-branching node as a cause explanatory variable to the display device 106.

When the satisfiability determination result of the satisfiability determination unit 115 indicates satisfaction, the violation range search unit 118 classifies the explanatory variables into a search target explanatory variable and a non-search target explanatory variable based on a predetermined rule or user designation.

For (i) a search target violation input value that is a value of the search target explanatory variable and that constitutes the violation input value and (ii) a non-search target violation input value that is a value of the non-search target explanatory variable and that constitutes the violation input value, the violation range search unit 118 creates an upper limit value and a lower limit value of the search target explanatory variable to include the search target violation input value, and specifies a range equal to or smaller than the upper limit value and equal to or larger than the lower limit value as a search range of the search target explanatory variable.

During specifying of the search range, the violation range search unit 118 obtains a maximum value and a minimum value of the explanatory variable by referring to the data set 1261 and applies a predetermined rule to the maximum value or the minimum value, and during the creation of the upper limit value and the lower limit value, preferably calculates a unit value to be added to or subtracted from the search target violation input value. For example, when the maximum value is 1000, the maximum value is divided by 100, and the unit value is 10. Further, when the maximum value is 10, the maximum value is divided by 10, and the unit value is 1. In other words, the value to be divided is also increased proportionally in accordance with the number of digits of the maximum value or the minimum value, and an increment during enlargement of the search range (that is, addition or subtraction is performed on the search target violation input value) can be set appropriately in accordance with a value range of the explanatory variable.

In this case, the violation range search unit 118 may change, based on the number of times the addition or the subtraction is performed during a predetermined period, the unit value to be added to or subtracted from the above-described search target violation input value in accordance with a predetermined rule. For example, the operation can be assumed as the following. When the addition is performed five times in last 10 minutes, a degree of the addition is determined to be insufficient, and the unit value is increased by a predetermined ratio.

The violation range search unit 118 creates a search range logical expression meaning that the value of the search target explanatory variable is within the search range.

The violation range search unit 118 sets the non-search target violation input value of the non-search target explanatory variable as a limit range of the non-search target explanatory variable, and creates a limit range logical expression meaning that the value of the non-search target explanatory variable is within the limit range.

The violation range search unit 118 creates a second combined logical expression by logically combining the search range logical expression and the limit range logical expression with the combined logical expression, and obtains a satisfiability determination result of the second combined logical expression by inputting the second combined logical expression to the satisfiability determiner 1151.

When the satisfiability determination result indicates satisfaction, the violation range search unit 118 specifies a range equal to or smaller than the upper limit value and equal to or larger than the lower limit value as a violation range of the search target explanatory variable.

When the satisfiability determination result of the second combined logical expression indicates satisfaction, the violation range search unit 118 classifies the explanatory variables into a second search target explanatory variable and a second non-search target explanatory variable based on a predetermined rule or user designation.

When a violation range has been created for the second search target explanatory variable, the violation range search unit 118 creates an upper limit value and a lower limit value of the second search target explanatory variable such that the violation range is included.

The violation range search unit 118 sets a range, which is equal to or smaller than the upper limit value and equal to or larger than the lower limit value and does not include the violation range, as a search range of the second search target explanatory variable, and creates a search range logical expression meaning that a value of the second search target explanatory variable is within the search range.

When a violation range has been created for the second non-search target explanatory variable, the violation range search unit 118 sets the violation range as a limit range of the second non-search target explanatory variable, and creates a limit range logical expression meaning that a value of the second non-search target explanatory variable is within the limit range.

The violation range search unit 118 creates a third combined logical expression by logically combining the search range logical expression and the limit range logical expression with the combined logical expression, and obtains a satisfiability determination result of the third combined logical expression by inputting the third combined logical expression to the satisfiability determiner 1151.

When the satisfiability determination result indicates satisfaction, the violation range search unit 118 specifies a range equal to or smaller than the upper limit value and equal to or larger than the lower limit value as a violation range of the second search target explanatory variable.

When the satisfiability determination result of the second combined logical expression or the third combined logical expression indicates unsatisfiability, the violation range search unit 118 obtains the explanatory variable. When the violation range has been set for the explanatory variable, the violation range search unit 118 creates a premise range designation logical expression meaning that a value of the explanatory variable is outside the violation range.

When no violation range has been set for the explanatory variable, the violation range search unit 118 creates a premise range designation logical expression meaning that the value of the explanatory variable is equal to the violation input value, and creates a fourth combined logical expression by combining the premise range designation logical expression with the combined logical expression.

The violation range search unit 118 obtains a satisfiability determination result of the fourth combined logical expression by inputting the fourth combined logical expression to the satisfiability determiner 1151.

When the satisfiability determination result indicates satisfaction, the violation range search unit 118 obtains a satisfaction solution thereof from the satisfiability determiner 1151, and obtains, from the satisfaction solution, (i) a violation input value that is a value of the explanatory variable that violates the verification property and (ii) a violation output value that is a value of the objective variable corresponding to the violation input value.

When the satisfiability determination result of the second combined logical expression or the third combined logical expression indicates satisfaction, the violation range search unit 118 obtains the satisfaction solution, and obtains, from the satisfaction solution, (i) the violation input value that is the value of the explanatory variable that violates the verification property and (ii) the violation output value that is the value of the objective variable corresponding to the violation input value.

When the satisfiability determination result of the second combined logical expression or the third combined logical expression indicates unsatisfiability, the violation range division unit 119 stores a range included in the search range of the search target explanatory variable and the limit range of the non-search target explanatory variable, and divides a multi-dimensional space of the input values representing the violation ranges by a first hyperplane that passes through the upper limit value of the search range of the search target explanatory variable and that takes a basis vector of the search target explanatory variable as a normal vector, a second hyperplane that passes through the lower limit value of the search range of the search target explanatory variable and that takes a basis vector of the search target explanatory variable as a normal vector, a third hyperplane that passes through the upper limit value of the limit range of the non-search target explanatory variable and that takes a basis vector of the non-search target explanatory variable as a normal vector, and a fourth hyperplane that passes through the lower limit value of the limit range of the non-search target explanatory variable and that takes a basis vector of the non-search target explanatory variable as a normal vector.

The violation range division unit 119 specifies, among the divided spaces obtained by the division, a space surrounded by the first hyperplane, the third hyperplane, and the fourth hyperplane as a reconfirmation space, creates a reconfirmation space logical expression meaning that the input value is included in the reconfirmation space, and creates a fifth combined logical expression by logically combining the reconfirmation space logical expression with the combined logical expression.

The violation range division unit 119 obtains a satisfiability determination result of the fifth combined logical expression by inputting the fifth combined logical expression to the satisfiability determiner 1151, and when the satisfiability determination result indicates satisfaction, the violation range division unit 119 specifies, as a violation range, a plurality of multi-dimensional spaces obtained by removing a space surrounded by the first hyperplane, the second hyperplane, the third hyperplane, and the fourth hyperplane from the divided spaces.

On the other hand, when the determination result indicates unsatisfiability, the violation range division unit 119 specifies, as a violation range, a plurality of multi-dimensional spaces obtained by removing the reconfirmation space and the space surrounded by the first hyperplane, the second hyperplane, the third hyperplane, and the fourth hyperplane from the divided spaces.

Figures 26, 27:
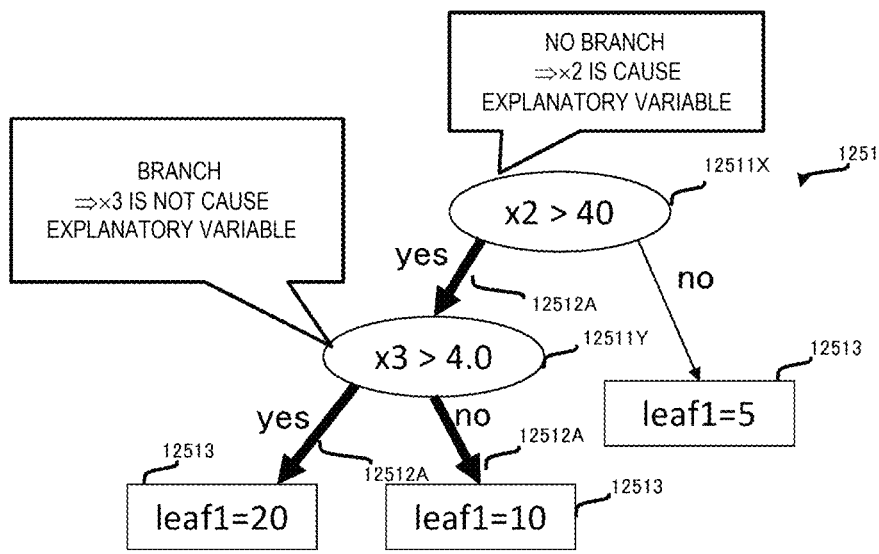
FIG. 26 is a diagram showing an example in which a highlighted path branches according to the present embodiment.
FIG. 27 is a diagram showing a source code of an input filter according to the present embodiment.

When the value of the explanatory variable is received by the input device 105 as an input value for the machine learning model 1251, and the value of the explanatory variable is not included in any of the violation ranges, the input filter generation unit 120 generates a source code 1201 (see FIG. 27) of an input filter program for transmitting the input value to the machine learning model 1251.

The machine learning program verification apparatus 100 includes a machine learning model storage unit 125, a data set storage unit 126, the violation input value and output value storage unit 127, and a violation range storage unit 128 as storage units for information to be used by the functional units or storage units that store processing results.

The machine learning model storage unit 125 among the storage units described above is a storage unit that stores the machine learning model 1251. A specific example of the machine learning model 1251 will be described below.

The data set storage unit 126 is a storage unit that stores the data set 1261. A specific example of the data set 1261 will be described below.

The violation input value and output value storage unit 127 is a storage unit that stores a violation input value and output value 1271. A specific example of the violation input value and output value 1271 will be described below.

The violation range storage unit 128 is a storage unit that stores a violation range 1281. A specific example of the violation range 1281 will be described below.

<Hardware Configuration>

Figure 2:
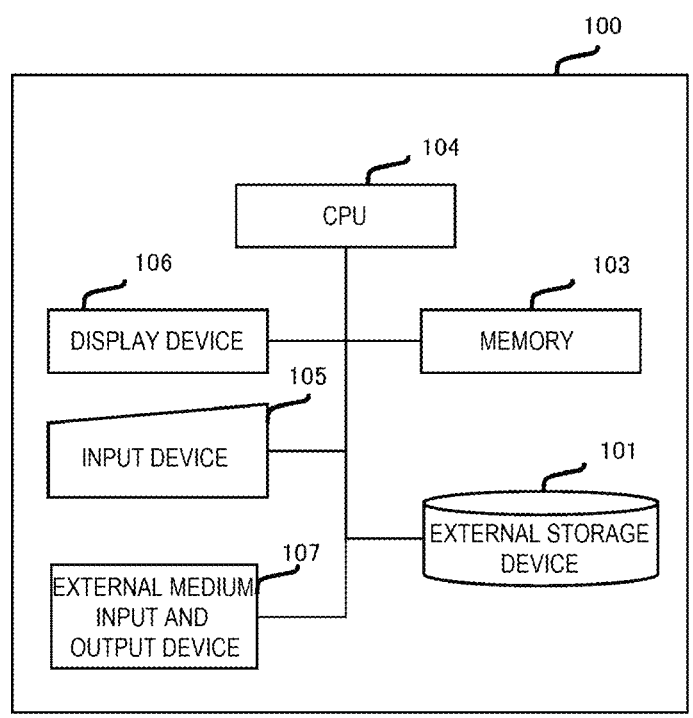
FIG. 2 is a diagram showing an example of a hardware configuration of the machine learning program verification apparatus according to the present embodiment.

The hardware configuration of the machine learning program verification apparatus 100 is as shown in FIG. 2. That is, the machine learning program verification apparatus 100 includes an external storage device 101, a memory 103, a CPU 104, the input device 105, the display device 106, and an external medium input and output device 107.

Among the devices described above, the external storage device 101 is configured with an appropriate nonvolatile storage element such as a solid state drive (SSD) or a hard disk drive.

The memory 103 is configured with a volatile storage element such as a RAM.

The CPU 104 is a calculation device that performs various determinations, calculations, and control processing while performing overall control of the device itself by reading a program 102 stored in the external storage device 101 into the memory 103 and the like and executing the program 102.

The input device 105 is a display, a mouse, a microphone, or the like that receives a key input or a voice input from a user.

The display device 106 is a display or the like that displays processing data.

The external medium input and output device 107 is a device that includes various interfaces of storage media and inputs data from and outputs data to the storage medium via the interfaces. For example, an operation form can be assumed in such a manner that the storage medium that stores the machine learning model 1251 and the data set 1261 is set in the external medium input and output device 107, the machine learning model 1251 is stored in the machine learning model storage unit 125, and the data set 1261 is stored in the data set storage unit 126.

In the external storage device 101, in addition to the program 102 for implementing a function necessary as the machine learning program verification apparatus 100 in the present embodiment, at least the machine learning model storage unit 125, the data set storage unit 126, the violation input value and output value storage unit 127, and the violation range storage unit 128 that have been described are stored.

As functions implemented by the CPU 104 executing the program 102, there are the decision tree logical expression creation unit 110, the verification property logical expression creation unit 111, the objective variable calculation logical expression creation unit 112, the explanatory variable upper and lower limit logical expression creation unit 113, the verification unit 114, the satisfiability determination unit 115, the violation path display unit 116, the cause extraction unit 117, the violation range search unit 118, the violation range division unit 119, and the input filter generation unit 120.

<Example of Machine Learning Model>

Figures 3, 4:
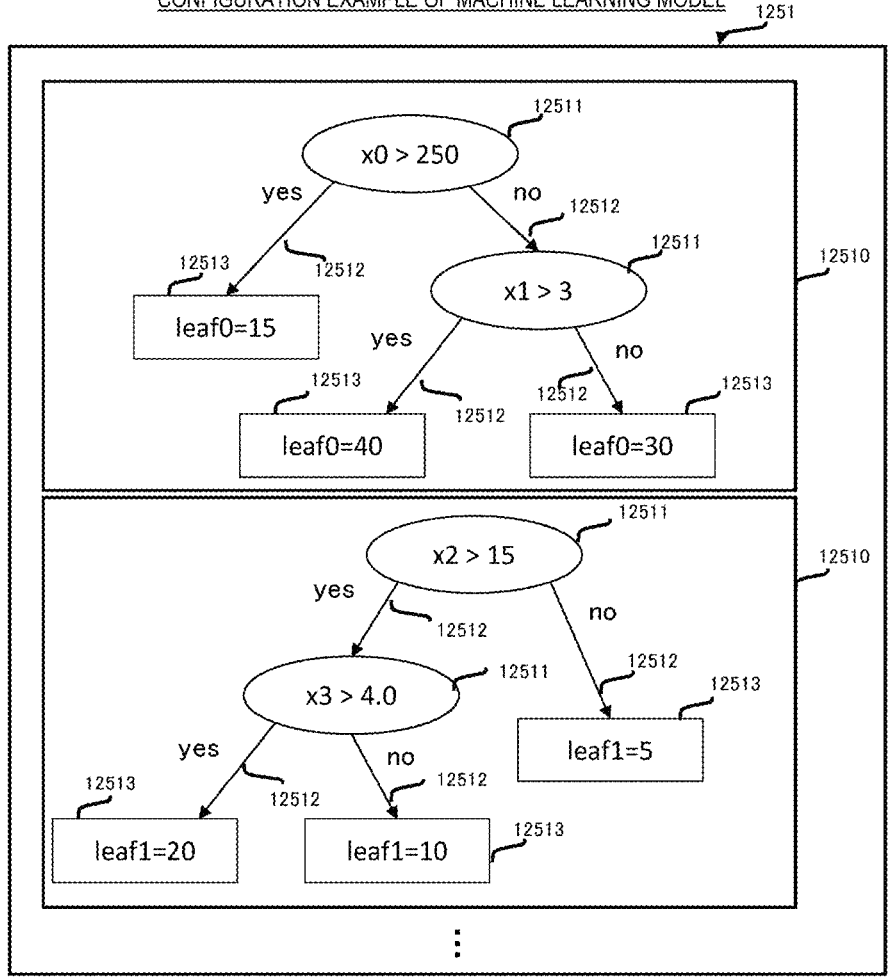
FIG. 3 is a diagram showing a configuration example of a machine learning model according to the present embodiment.
FIG. 4 is a table showing a configuration example of a data set according to the present embodiment.

FIG. 3 shows a configuration example of the machine learning model 1251 in the present embodiment. The machine learning model 1251 in the present embodiment is a program created by the machine learning, in which the value of the objective variable is output with the value of the explanatory variable as the input, in accordance with the prediction algorithm based on the ensemble tree including a plurality of decision trees.

As shown in FIG. 3, the configuration of the machine learning model includes a plurality of decision trees 12510, and each decision tree 12510 includes nodes 12511, paths 12512, and leaves 12513.

The node 12511 among the components described above corresponds to a conditional expression of the explanatory variable (for example: X0, X1, ... ). Further, the path 12512 indicates a conditional branch of the node 12511. Further, the leaf 12513 indicates a value of the objective variable specified by the conditional branch of the node 12511 serving as a root.

<Example of Data Set>

FIG. 4 shows a configuration example of the data set 1261 in the present embodiment. The data set 1261 in the present embodiment is track record data to be input during learning of the machine learning model 1251, and track record data on a price, an inventory, and the number of sales (monthly) of each product to be manufactured and sold by a certain company is assumed and exemplified here. The data set 1261 can be original data of the upper limit value and the lower limit value of the value of the objective variable.

Flow Example 1

Hereinafter, an actual procedure of a machine learning program verification method in the present embodiment will be described with reference to the drawings. Various operations corresponding to the machine learning program verification method described below are implemented by the machine learning program verification apparatus 100 reading the program 102 into the memory or the like and executing the program 102. Further, the program 102 includes codes for performing the various operations to be described below.

FIG. 5 is a flowchart showing a flow example 1 of the machine learning program verification method in the present embodiment.

In this case, the decision tree logical expression creation unit 110 logically combines the path logical expressions indicating the decision tree paths in the decision trees to create the decision tree logical expression (see a decision tree logical expression 1101 in FIG. 6) for the machine learning model 1251 (s1). In this case, the decision tree logical expression creation unit 110 extracts the decision tree path from the decision tree, and creates the path logical expression including a path condition of the extracted decision tree path. In any case, an existing technology for extracting the decision tree path from the decision tree and generating the logical expression of the decision tree path may be applied as appropriate.

Subsequently, the verification property logical expression creation unit 111 receives, by the input device 105, the user input of the verification property defined as the relationship between the explanatory variable and the objective variable in the machine learning model 1251, and creates the verification property logical expression (see a verification property logical expression 1111 in FIG. 7) based on the verification property received here (s2).

Thereafter, the objective variable calculation logical expression creation unit 112 creates the objective variable calculation logical expression (an objective variable calculation logical expression 1121 in FIG. 8) that defines the relationship between the decision tree output values of each decision tree (leaves 12513 of the decision tree 12510) and the value of the objective variable (an output value y of the machine learning model 1251 that is a value obtained by adding up values of the leaves 12513) (s3). The creation may be performed by receiving user designation in place of a case of automatically generating a mathematical expression for adding up the leaves 12513 of each decision tree 12510.

Subsequently, the explanatory variable upper and lower limit logical expression creation unit 113 obtains the maximum value and the minimum value of the explanatory variable by referring to the data set 1261, and creates the explanatory variable range limit logical expression (see an explanatory variable upper and lower limit logical expression 1131 in FIG. 9) indicating that the value of the explanatory variable is equal to or smaller than the maximum value and equal to or larger than the minimum value (s4). For automatic generation of such a logical expression, an existing technology may be applied as appropriate (the same applies hereinafter).

Subsequently, the verification unit 114 logically combines the verification property logical expression 1111 indicating the verification property to be verified for the machine learning model 1251, the objective variable calculation logical expression 1121 that defines the relationship between the decision tree output values of each decision tree and the value of the objective variable, and an explanatory variable upper and lower limit logical expression 1131 with the decision tree logical expression 1101 to create the combined logical expression (see the combined logical expression 1141 in FIG. 10) (s5).

The satisfiability determination unit 115 inputs the combined logical expression obtained in s5 to the satisfiability determiner 1151 to obtain the satisfiability determination result of the combined logical expression (s6).

When the satisfiability determination result does not indicate satisfiability (s7: NO), it is determined that there is no problem in the machine learning model 1251, a result thereof (see a verification result example 1152 in FIG. 12) is output to the display device 106 (s9), and the processing ends.

On the other hand, when the satisfiability determination result indicates satisfaction (s7:YES), it is determined that there is a problem in the machine learning model 1251, and the satisfiability determination unit 115 obtains, from the satisfaction solution indicated by the satisfiability determiner 1151, (i) the violation input value that is the value of the explanatory variable that violates the verification property and (ii) the violation output value that is the value of the objective variable corresponding to the violation input value (s8).

The satisfiability determination unit 115 outputs the verification result including the violation input value and the violation output value (see the verification result example 1152 in FIG. 11) to the display device 106 (s9), and ends the processing.

Flow Example 2

FIG. 13 is a flowchart showing a flow example 2 of the machine learning program verification method of the present embodiment, and specifically, a flowchart showing a flow in the decision tree logical expression creation unit 110.

In this case, the decision tree logical expression creation unit 110 obtains the machine learning model 1251 from the machine learning model storage unit 125 (s10).

The decision tree logical expression creation unit 110 obtains the decision tree 12510 that constitutes the machine learning model 1251 (s11).

Subsequently, the decision tree logical expression creation unit 110 executes a depth-first search in the decision tree 12510 obtained in s11 to extract a path (s12).

When a condition described in a node of the path extracted in s12 is satisfied, the decision tree logical expression creation unit 110 creates the path logical expression indicating that a condition of the leaf 12513 (leaf node) is satisfied (s13).

Subsequently, the decision tree logical expression creation unit 110 determines whether the processing has been performed for all the decision trees 12510 in the machine learning model 1251 obtained in s10 in the processing so far (s14).

When there is an unprocessed decision tree 12510 as a result of the determination (s14: NO), the decision tree logical expression creation unit 110 returns the processing to s11.

On the other hand, when the processing has been performed for all the decision trees 12510 as a result of the determination (s14: YES), the decision tree logical expression creation unit 110 logically combines the path logical expressions created for the decision trees to create the decision tree logical expression (s15), and ends the processing.

Flow Example 3

FIG. 14 is a flowchart showing a flow example 3 of the machine learning program verification method of the present embodiment, and specifically, a flowchart showing a flow example in the explanatory variable upper and lower limit logical expression creation unit 113.

In this case, the explanatory variable upper and lower limit logical expression creation unit 113 obtains the data set (s20).

The explanatory variable upper and lower limit logical expression creation unit 113 selects one explanatory variable (for example: select in accordance with a predetermined rule such as an ascending order or a descending order of coefficients or values of a subscript) (s21).

The explanatory variable upper and lower limit logical expression creation unit 113 searches the data set and obtains the maximum value and the minimum value of the explanatory variable (s22).

Subsequently, the explanatory variable upper and lower limit logical expression creation unit 113 creates the logical expression meaning that the explanatory variable is equal to or smaller than the maximum value obtained in s22 and equal to or larger than the minimum value obtained in s22 (*s*23).

Subsequently, the explanatory variable upper and lower limit logical expression creation unit 113 determines whether the processing has been performed for all the explanatory variables so far (s24).

When there is an unprocessed explanatory variable as a result of the determination (s24: NO), the explanatory variable upper and lower limit logical expression creation unit 113 returns the processing to s21.

On the other hand, when the processing has been performed for all the explanatory variables as a result of the determination (s24: YES), the explanatory variable upper and lower limit logical expression creation unit 113 logically combines upper limit logical expressions and lower limit logical expressions that are created for the explanatory variables (s25), and ends the processing.

Flow Examples 4, 5

Figure 15:
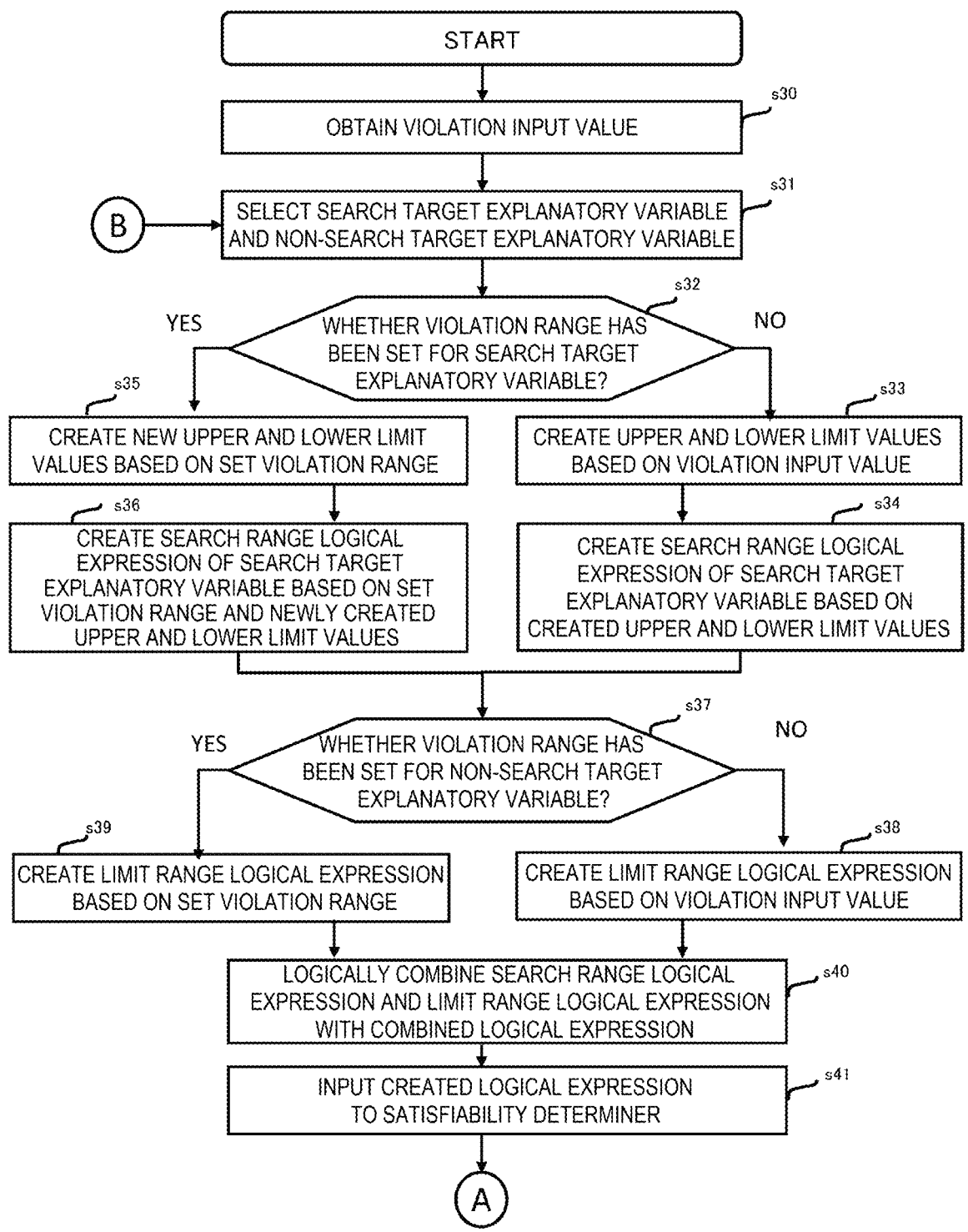
FIG. 15 is a flowchart showing a flow example 4 of the machine learning program verification method according to the present embodiment.
Figure 16:
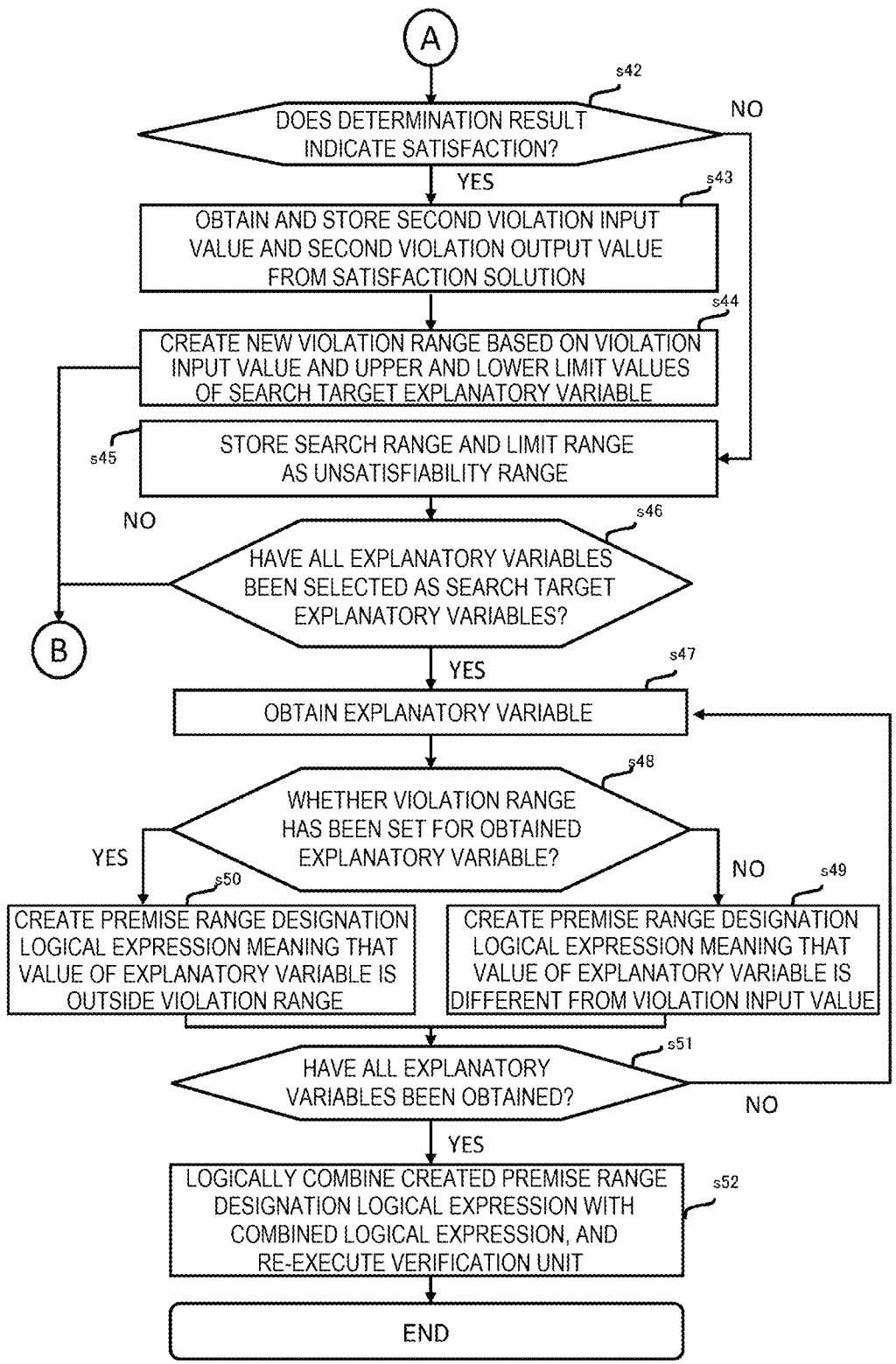
FIG. 16 is a flowchart showing a flow example 5 of the machine learning program verification method according to the present embodiment.
Figure 18A:
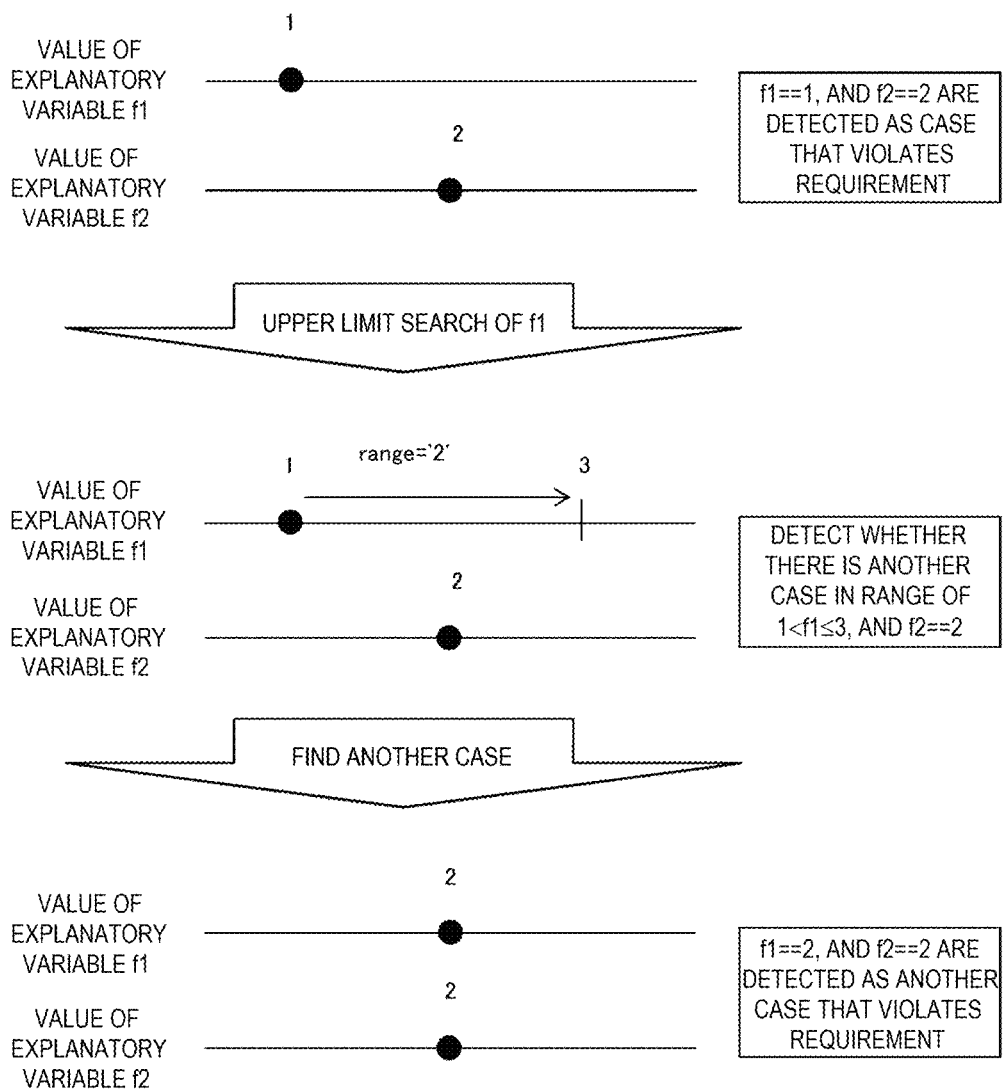
FIG. 18A is a diagram showing a conceptual example 1 of a violation range search according to the present embodiment.
Figure 18C:
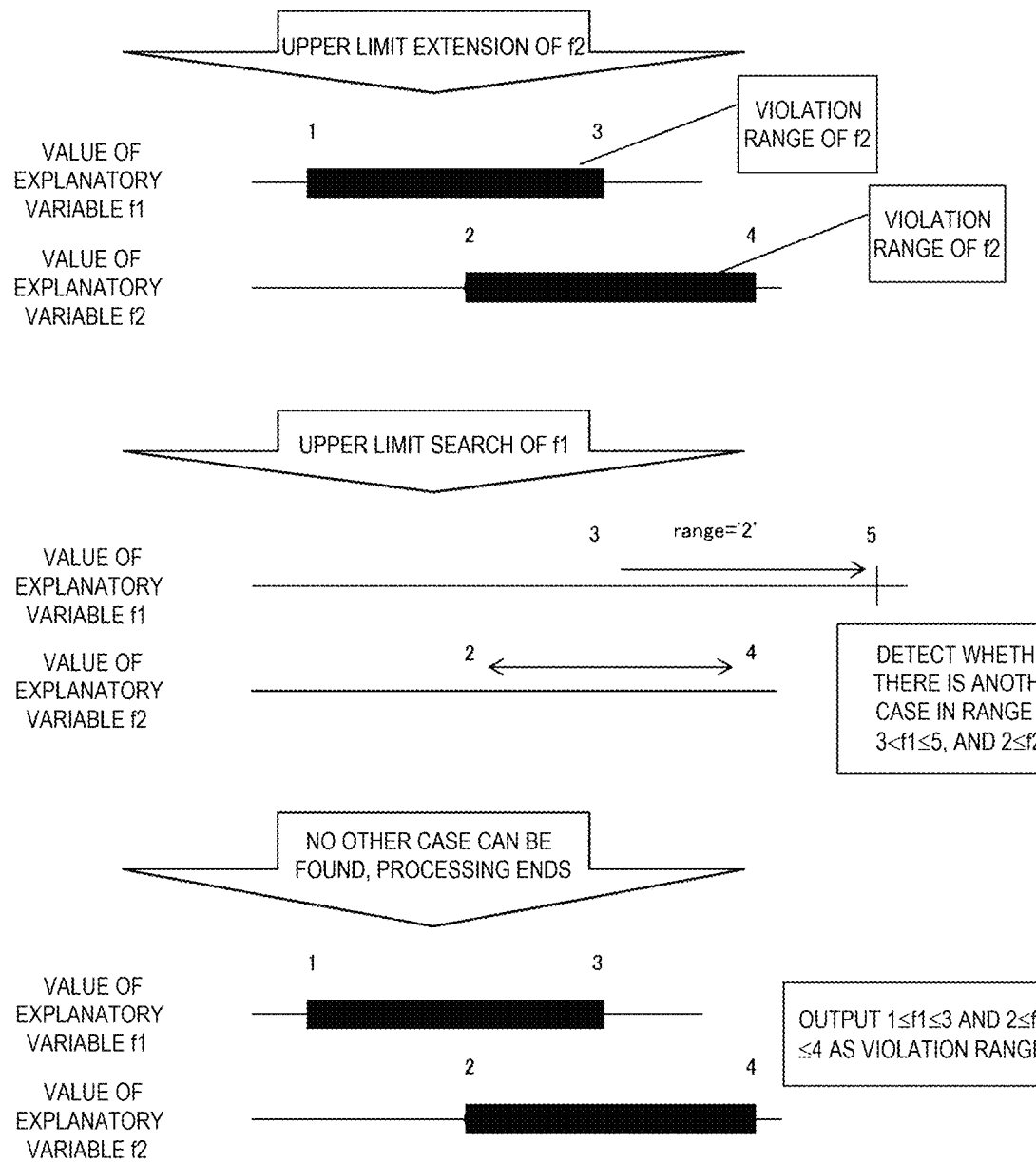
FIG. 18C is a diagram showing a conceptual example 3 of the violation range search according to the present embodiment.

FIGS. 15 and 16 are flowcharts showing flow examples 4 and 5 of the machine learning program verification method of the present embodiment, and specifically, flowcharts showing a flow example in the violation range search unit 118. Further, FIG. 17 is a table showing an example of the violation input value and output value in the present embodiment, and FIGS. 18A to 18C are diagrams showing conceptual examples 1 to 3 of a violation range search in the present embodiment.

In this case, the violation range search unit 118 obtains the violation input value (s30). The violation input value corresponds to the verification result example 1152 that has already been obtained as a result of the flow in FIG. 5.

Subsequently, the violation range search unit 118 selects the search target explanatory variable and the non-search target explanatory variable in accordance with a predetermined rule (for example: an ascending order of subscripts of the explanatory variable. f1 is selected as the search target explanatory variable, and f2 is selected as the non-search target explanatory variable) (s31).

The violation range search unit 118 determines whether the violation range has been set for the search target explanatory variable (s32), which is processing of determining whether the range has been set by adding the unit value to or subtracting the unit value from the violation input value.

When no violation range has been set as a result of the determination (s32: NO), the violation range search unit 118 creates the upper and lower limit values based on the violation input value (s33).

When creating the upper limit value and the lower limit value, the violation range search unit 118 obtains the maximum value and the minimum value of the explanatory variable by referring to the data set 1261, and calculates the unit value by applying a predetermined rule to the maximum value or the minimum value. For example, when the maximum value is 1000, the maximum value is divided by 100, and the unit value is 10. Further, when the maximum value is 10, the maximum value is divided by 10, and the unit value is 1. In other words, the value to be divided is also increased proportionally in accordance with the number of digits of the maximum value or the minimum value, and the increment during the enlargement of the search range (that is, the addition or the subtraction is performed on the search target violation input value) can be set appropriately in accordance with the value range of the explanatory variable.

The violation range search unit 118 creates the search range logical expression of the search target explanatory variable based on the upper and lower limit values created in s33 (*s*34).

In this case, the violation range search unit 118 may change, based on the number of times the addition or the subtraction is performed during a predetermined period, the unit value to be added to or subtracted from the search target violation input value in accordance with a predetermined rule. For example, the operation can be assumed as the following. When the addition is performed five times in last 10 minutes, a degree of the addition is determined to be insufficient, and the unit value is increased by a predetermined ratio.

On the other hand, when the violation range has been set as a result of the determination (s32: YES), the violation range search unit 118 creates new upper and lower limit values based on the set violation range (s35). The method for creating the upper and lower limit values is similar to that of s33.

The violation range search unit 118 creates the search range logical expression of the search target explanatory variable based on the set violation range and the newly created upper and lower limit values (s36).

Subsequently, the violation range search unit 118 determines whether the violation range has been set for the non-search target explanatory variable (s37).

When no violation range has been set as a result of the determination (s37: NO), the violation range search unit 118 creates the limit range logical expression based on the violation input value (s38).

On the other hand, when the violation range has been set as a result of the determination (s37: YES), the violation range search unit 118 creates the limit range logical expression based on the set violation range (s39).

Subsequently, the violation range search unit 118 logically combines the search range logical expression and the limit range logical expression with the combined logical expression (s40).

The violation range search unit 118 inputs the logical expression created in s40 to the satisfiability determiner 1151 (s41).

Subsequently, the violation range search unit 118 determines whether the result of s41 indicates satisfaction (s42).

When the satisfaction is not indicated as a result of the determination (s42: NO), the violation range search unit 118 shifts the processing to s45.

On the other hand, when the satisfaction is indicated as a result of the determination (s42: YES), the violation range search unit 118 obtains and stores the second violation input value and the second violation output value from the satisfaction solution (s43).

Subsequently, the violation range search unit 118 creates the new violation range based on the violation input value and the upper and lower limit values of the search target explanatory variable (s44).

Subsequently, the violation range search unit 118 stores the search range and the limit range as the unsatisfiability range (s45).

Subsequently, the violation range search unit 118 determines whether all the explanatory variables have been selected as the search target explanatory variables (s46).

When there is an unselected explanatory variable as a result of the determination (s46: NO), the violation range search unit 118 returns the processing to s31.

On the other hand, when all the explanatory variables have been selected as the search target explanatory variables as a result of the determination (s46: YES), the violation range search unit 118 obtains an explanatory variable (s47).

The violation range search unit 118 determines whether the violation range has been set for the obtained explanatory variable (s48).

When no violation range has been set as a result of the determination (s48: NO), the violation range search unit 118 creates the premise range designation logical expression meaning that the value of the explanatory variable is different from the violation input value (s49).

On the other hand, when the violation range has been set as a result of the determination (s48: YES), the violation range search unit 118 creates the premise range designation logical expression meaning that the value of the explanatory variable is outside the violation range (s50).

The violation range search unit 118 determines whether all the explanatory variables have been obtained (s51).

When there is an explanatory variable that is not obtained as a result of the determination (s51: NO), the violation range search unit 118 returns the processing to s47.

On the other hand, when all the explanatory variables have been obtained as a result of the determination (s51: YES), the violation range search unit 118 logically combines the created premise range designation logical expression with the combined logical expression (s52), and ends the processing. In this case, the verification unit is executed again.

Flow Example 6

Figure 19:
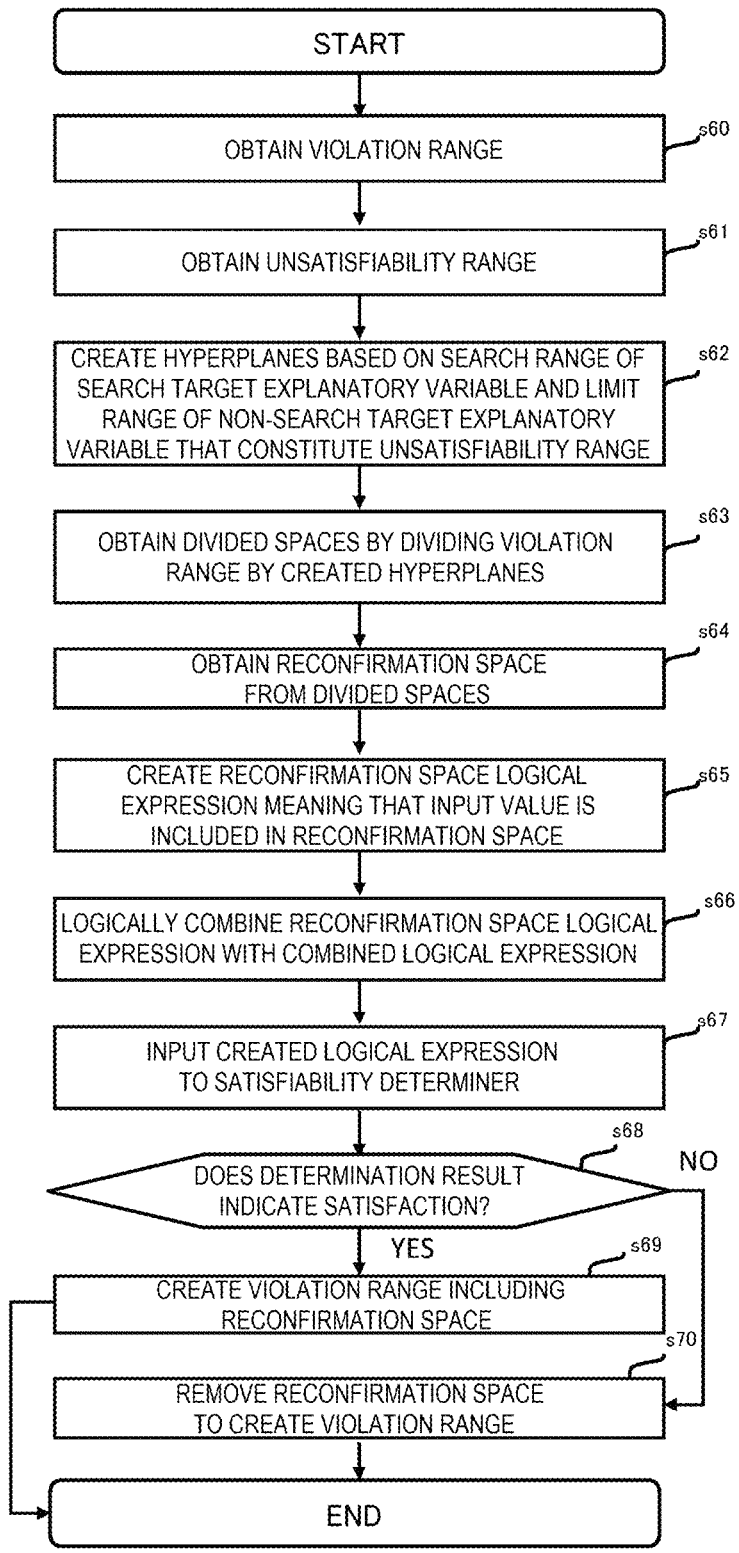
FIG. 19 is a flowchart showing a flow example 6 of the machine learning program verification method according to the present embodiment.
Figures 20, 21:
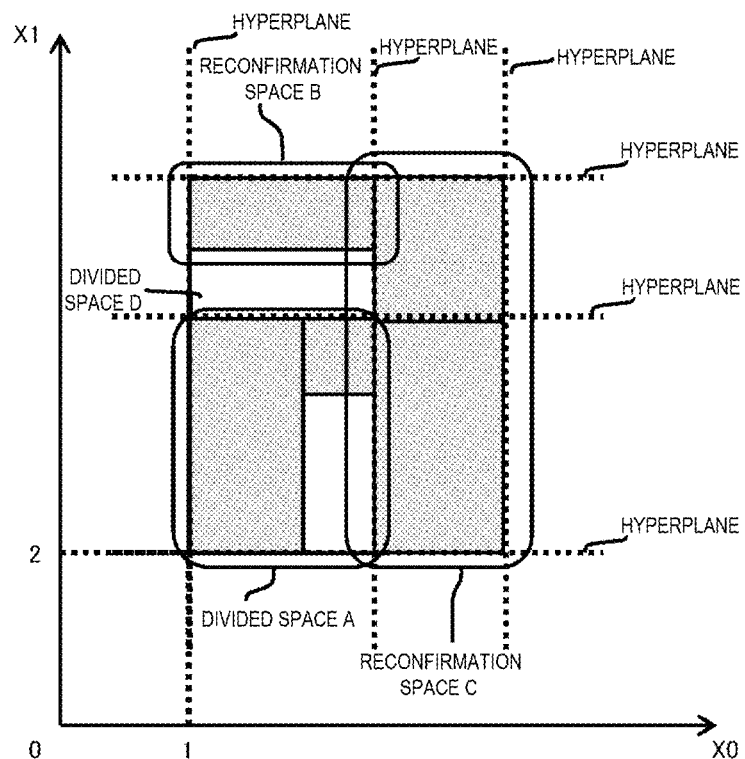
FIG. 20 is a diagram showing a conceptual example of division of violation ranges according to the present embodiment.
FIG. 21 is a table showing an example of the violation range according to the present embodiment.

FIG. 19 is a flowchart showing a flow example 6 of the machine learning program verification method of the present embodiment, and specifically, a flowchart showing a flow example of the violation range division unit 119. Further, FIG. 20 is a diagram showing a conceptual example of division of violation ranges in the present embodiment.

In this case, the violation range division unit 119 obtains the violation range (s60).

The violation range division unit 119 obtains the unsatisfiability range (range obtained in s45 of the flow example 5) (s61).

Subsequently, the violation range division unit 119 creates the hyperplanes based on the search range of the search target explanatory variable and the limit range of the non-search target explanatory variable that constitute the unsatisfiability range (s62).

The violation range division unit 119 divides the violation range by the created hyperplanes to obtain the divided spaces (s63).

The violation range division unit 119 obtains the reconfirmation space from the divided spaces (s64).

Subsequently, the violation range division unit 119 creates the reconfirmation space logical expression meaning that the input value is included in the reconfirmation space (s65).

Subsequently, the violation range division unit 119 logically combines the reconfirmation space logical expression with the combined logical expression (s66).

The violation range division unit 119 inputs the created logical expression to the satisfiability determiner (s67).

Subsequently, the violation range division unit 119 determines the satisfiability (s68).

When there is no satisfiability as a result of the determination (s68: NO), the violation range division unit 119 shifts the processing to s70.

On the other hand, when the satisfaction is indicated as a result of the determination (s68: YES), the violation range division unit 119 creates the violation range (see a violation range 1281 of FIG. 21) including the reconfirmation space (s69), and ends the processing.

The violation range division unit 119 removes the reconfirmation space to create the violation range (see the violation range 1281 of FIG. 21) (s70), and ends the processing.

Flow Examples 7, 8

Figure 22:
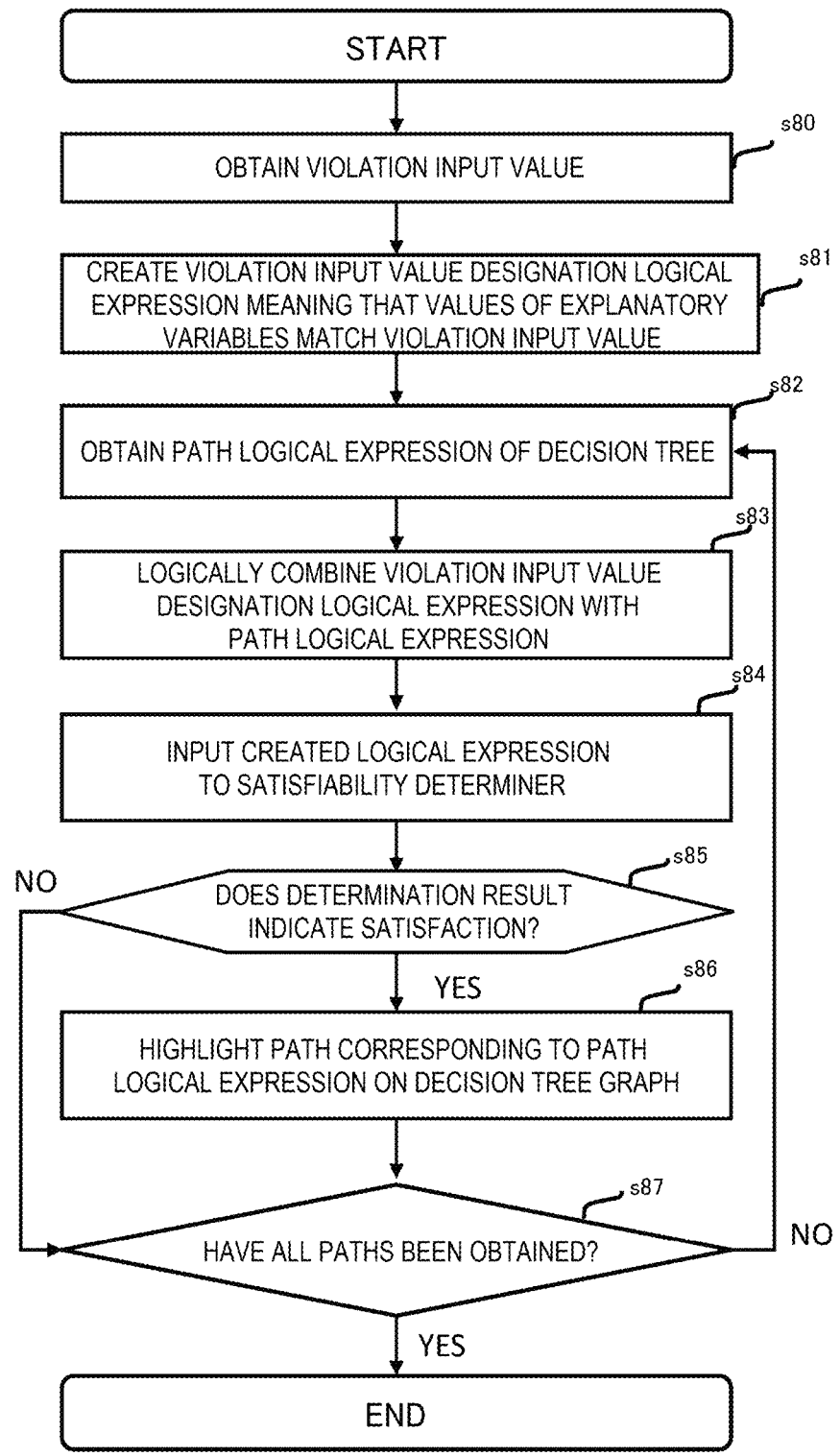
FIG. 22 is a flowchart showing a flow example 7 of the machine learning program verification method according to the present embodiment.
Figure 23:
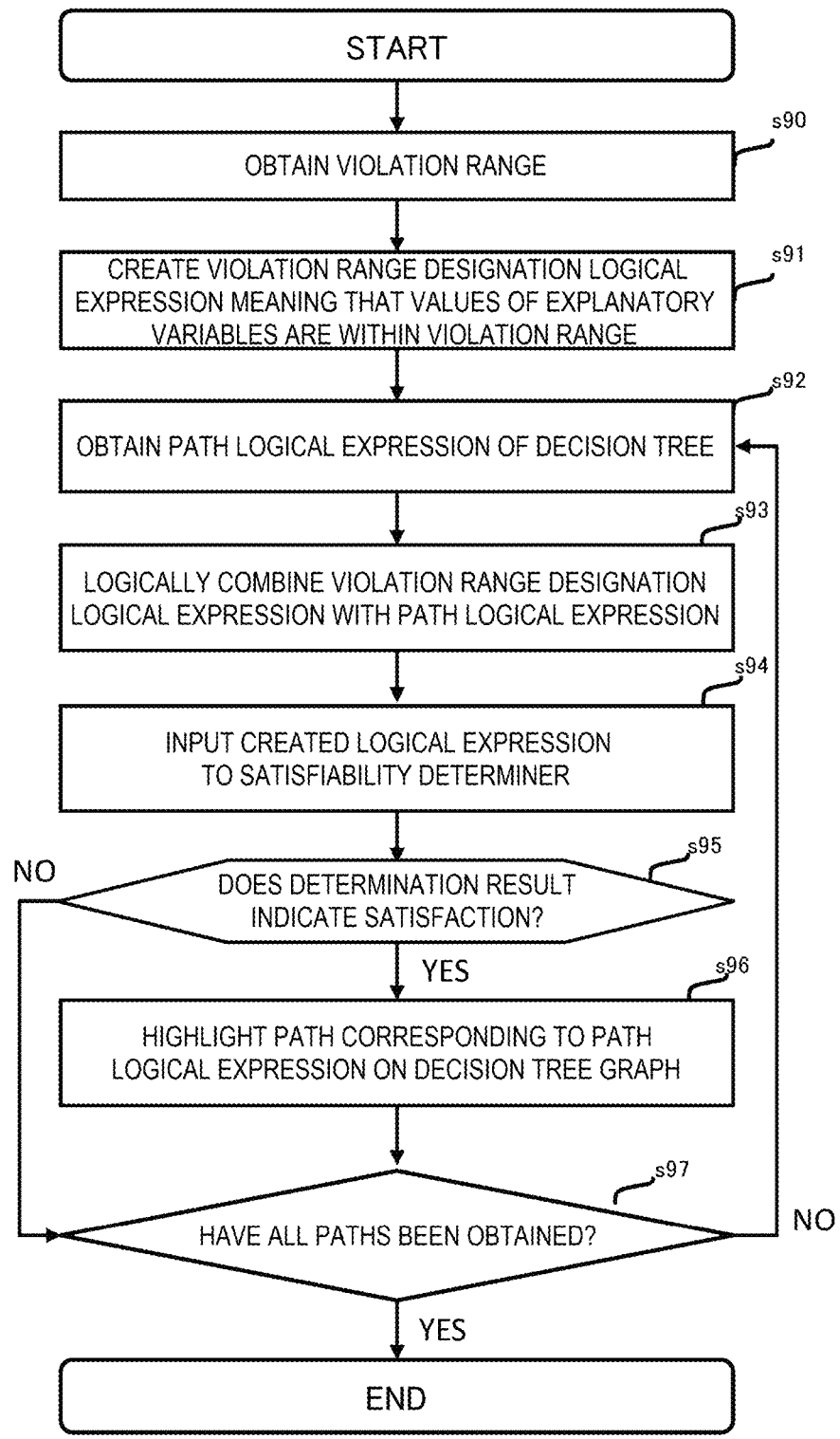
FIG. 23 is a flowchart showing a flow example 8 of the machine learning program verification method according to the present embodiment.
Figure 24:
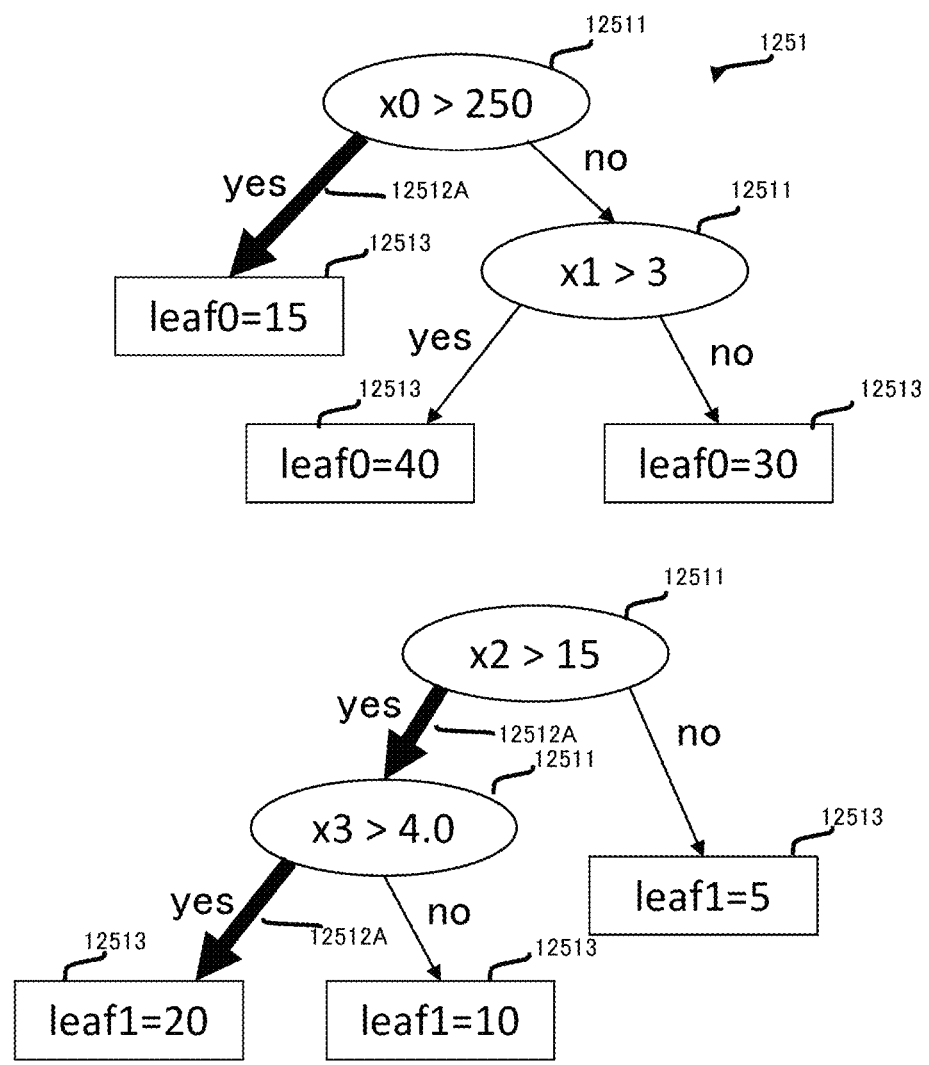
FIG. 24 is a diagram showing a display example of a violation path according to the present embodiment.

FIGS. 22 and 23 are flowcharts showing flow examples 7 and 8 of the machine learning program verification method of the present embodiment, and specifically, flowcharts showing flow examples in the violation path display unit 116. Further, FIG. 24 is a diagram showing a display example of the violation path in the present embodiment. A flow of FIG. 23 is similar to a flow of FIG. 22 except for a difference, that is, targets are a case of the "violation input value" and a case of the "violation range". Therefore, the flow of FIG. 23 will be described based on the flow of FIG. 22 here.

In this case, the violation path display unit 116 obtains the violation input value (s80).

Subsequently, the violation path display unit 116 creates the violation input value designation logical expression meaning that the values of the explanatory variables match the violation input value obtained in s80 (s81).

The violation path display unit 116 obtains the path logical expression of the decision tree (s82).

Subsequently, the violation path display unit 116 logically combines the violation input value designation logical expression obtained in s81 with the path logical expression obtained in s82 (s83).

The violation path display unit 116 inputs the logical expression created in s83 to the satisfiability determiner 1151 (s84).

The violation path display unit 116 determines the satisfiability of the created logical expression as a result of s84 (s85).

When the created logical expression is not satisfiable as a result of the determination (s85: NO), the violation path display unit 116 shifts the processing to s87.

On the other hand, when the created logical expression is satisfiable as a result of the determination (s85: YES), the violation path display unit 116 highlights a path 12512A (see FIG. 24) corresponding to the path logical expression on the decision tree graph 1251 by thickening a line segment of the path 12512A (s86).

The violation path display unit 116 determines whether all the paths have been obtained (s87).

When there is a path that is not obtained as a result of the determination (s87: NO), the violation path display unit 116 shifts the processing to s82.

On the other hand, when all the paths have been obtained (s87: YES), the violation path display unit 116 ends the processing.

Flow Example 9

Figure 25:
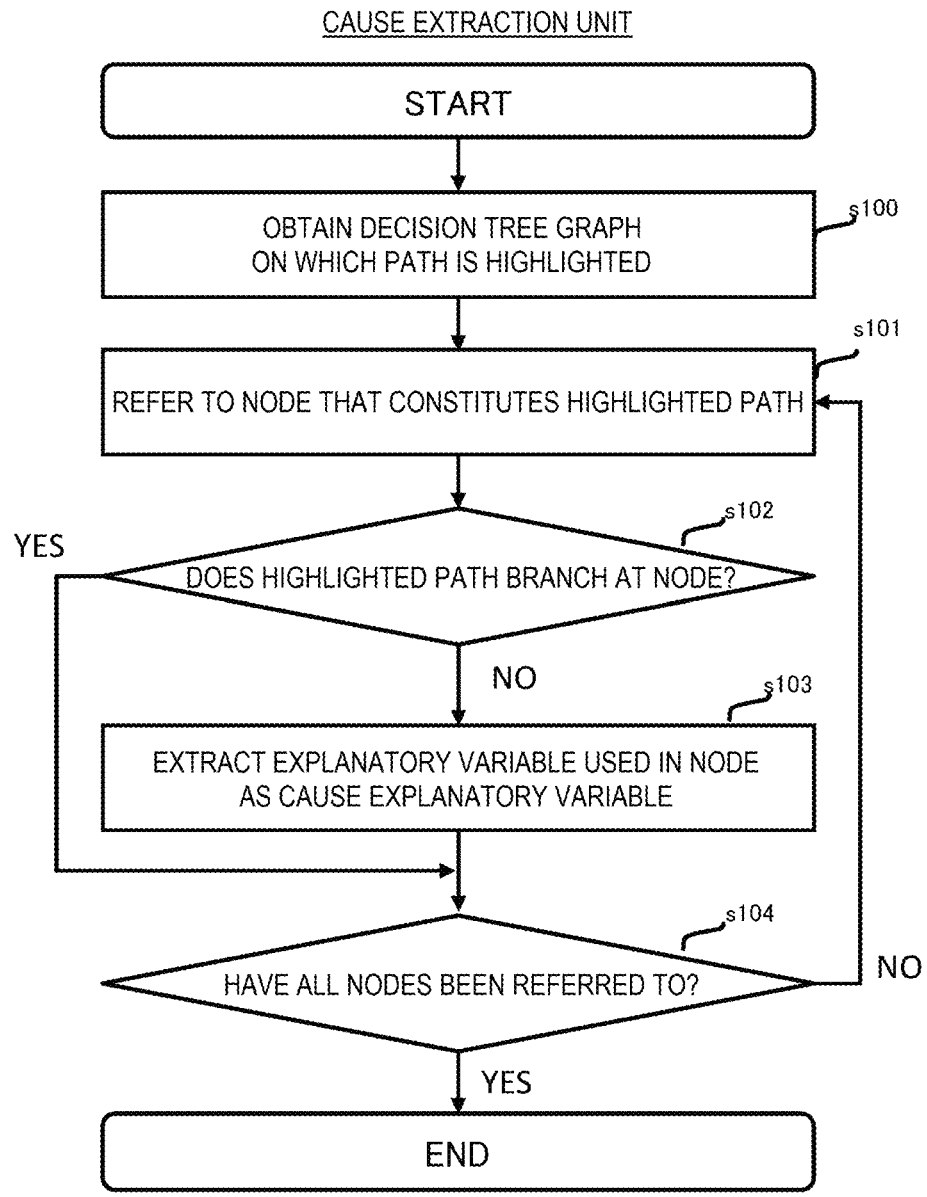
FIG. 25 is a flowchart showing a flow example 9 of the machine learning program verification method according to the present embodiment.

FIG. 25 is a flowchart showing a flow example 9 of the machine learning program verification method of the present embodiment, and specifically, a flowchart showing a flow example of the cause extraction unit 117.

In this case, the cause extraction unit 117 obtains the decision tree graph (the decision tree of FIG. 24) on which the path is highlighted (s100).

Subsequently, the cause extraction unit 117 refers to a node that constitutes the highlighted path (s101). The node is a node that is a derivation source of a plurality of paths. In a case of an example in FIG. 26, nodes 12511X and 12511Y are the nodes. Here, a processing target is, for example, the node 12511Y.

The cause extraction unit 117 determines whether the highlighted path 12512A branches at the node 12511Y specified in s101 (s102).

When the highlighted path 12512A has branched at the node 12511Y as a result of the determination (s102: YES), the cause extraction unit 117 shifts the processing to s104.

On the other hand, when the highlighted path 12512A does not branch at the node 12511X as a result of the determination (s102: NO), the cause extraction unit 117 extracts the explanatory variable used in the node 12511X as the cause explanatory variable (s103).

Subsequently, the cause extraction unit 117 determines whether all the nodes have been referred to (s104).

When there is a node that has not been referred to as a result of the determination (s104: NO), the cause extraction unit 117 returns the processing to s101.

On the other hand, when all the nodes have been referred to as a result of the determination (s104: YES), the cause extraction unit 117 ends the processing.

Although a best mode for carrying out the invention, and the like have been described specifically above, the invention is not limited thereto and may be modified in various ways without departing from a gist thereof.

According to this embodiment, the validity of the prediction model can be comprehensively evaluated.

According to the description of this specification, at least the following is clarified. That is, in the machine learning program verification apparatus in the present embodiment, the calculation device, (i) during the creation of the decision tree logical expression, may extract the decision tree path from the decision tree and create the path logical expression including the path condition of the extracted decision tree path, and (ii) during the creation of the verification property logical expression, may receive, by the input device, the user input of the verification property defined as the relationship between the explanatory variable and the objective variable, and may create the verification property logical expression based on the received verification property.

Accordingly, the decision tree logical expression and the verification property logical expression can be created with high accuracy, and thus the validity of the prediction model can be evaluated more comprehensively.

In the machine learning program verification apparatus in the present embodiment, the calculation device may further: (i) when the satisfiability determination result indicates satisfaction, classify the explanatory variable into the search target explanatory variable and the non-search target explanatory variable based on a predetermined rule or user designation, (ii) for the search target violation input value that is a value of the search target explanatory variable and that constitutes the violation input value, and the non-search target violation input value that is a value of the non-search target explanation variable and that constitutes the violation input value, create the upper limit value and the lower limit value of the search target explanatory variable to include the search target violation input value, and specify the range equal to or smaller than the upper limit value and equal to or larger than the lower limit value as the search range of the search target explanatory variable, (iii) create the search range logical expression meaning that the value of the search target explanatory variable is within the search range, (iv) set the non-search target violation input value of the non-search target explanatory variable as the limit range of the non-search target explanatory variable, and create the limit range logical expression meaning that the value of the non-search target explanatory variable is within the limit range, (v) create the second combined logical expression by logically combining the search range logical expression and the limit range logical expression with the combined logical expression, and (vi) obtain the satisfiability determination result of the second combined logical expression by inputting the second combined logical expression to the satisfiability determiner, and when the satisfiability determination result indicates satisfaction, specify the range equal to or smaller than the upper limit value and equal to or larger than the lower limit value as the violation range of the search target explanatory variable.

Accordingly, the violation range can be searched efficiently and accurately, and thus the validity of the prediction model can be evaluated more comprehensively.

In the machine learning program verification apparatus in the present embodiment, when the satisfiability determination result of the second combined logical expression indicates satisfaction, the calculation device may further: (i) classify the explanatory variable into the second search target explanatory variable and the second non-search target explanatory variable based on a predetermined rule or user designation, (ii) when the violation range has been created for the second search target explanatory variable, create the upper limit value and the lower limit value of the second search target explanatory variable such that the violation range is included, (iii) set the range that is equal to or smaller than the upper limit value and equal to or larger than the lower limit value and does not include the violation range as the search range of the second search target explanatory variable, and create the search range logical expression meaning that the value of the second search target explanatory variable is within the search range, (iv) when the violation range has been created for the second non-search target explanatory variable, set the violation range as the limit range of the second non-search target explanatory variable, and create the limit range logical expression meaning that the value of the second non-search target explanatory variable is within the limit range, (v) create the third combined logical expression by logically combining the search range logical expression and the limit range logical expression with the combined logical expression, and (vi) obtain the satisfiability determination result of the third combined logical expression by inputting the third combined logical expression to the satisfiability determiner, and when the satisfiability determination result indicates satisfaction, specify the range equal to or smaller than the upper limit value and equal to or larger than the lower limit value as the violation range of the second search target explanatory variable.

Accordingly, the violation range can be searched more efficiently and accurately, and thus the validity of the prediction model can be evaluated more comprehensively.

In the machine learning program verification apparatus in the present embodiment, when the satisfiability determination result of the second combined logical expression or the third combined logical expression indicates unsatisfiability, the calculation device may obtain the explanatory variable and may further: (i) when the violation range has been set for the explanatory variable, create the premise range designation logical expression meaning that the value of the explanatory variable is outside the violation range, (ii) when no violation range has been set for the explanatory variable, create the premise range designation logical expression meaning that the value of the explanatory variable is equal to the violation input value, (iii) create the fourth combined logical expression by combining the premise range designation logical expression with the combined logical expression, and (iv) obtain the satisfiability determination result of the fourth combined logical expression by inputting the fourth combined logical expression to the satisfiability determiner, and when the satisfiability determination result indicates satisfaction, obtain the satisfaction solution thereof from the satisfiability determiner, and obtain, from the satisfaction solution, the violation input value that is the value of the explanatory variable that violates the verification property and the violation output value that is the value of the objective variable corresponding to the violation input value.

Accordingly, the violation range can be searched more efficiently and accurately, and thus the validity of the prediction model can be evaluated more comprehensively.

In the machine learning program verification apparatus in the present embodiment, when the satisfiability determination result of the second combined logical expression or the third combined logical expression indicates satisfaction, the calculation device may obtain the satisfaction solution and may further: obtain, from the satisfaction solution, the violation input value that is a value of the explanatory variable that violates the verification property and the violation output value that is a value of the objective variable corresponding to the violation input value.

Accordingly, the violation input value and the violation output value can be collected efficiently, and thus the validity of the prediction model can be evaluated more comprehensively.

In the machine learning program verification apparatus in the present embodiment, the calculation device may further: (i) create the violation input value designation logical expression meaning that the value of the explanatory variable that appears in the path logical expression matches the violation input value or the second violation input value, (ii) create the violation input value-designated path logical expression by logically combining the violation input value designation logical expression with the path logical expression, (iii) obtain the satisfiability determination result of the violation input value-designated path logical expression by inputting the violation input value-designated path logical expression to the satisfiability determiner, and when the satisfiability determination result indicates satisfaction, obtain the corresponding decision tree path as the violation path, and (iv) display the decision tree as the decision tree graph on the screen, and highlight the violation path on the decision tree graph.

Accordingly, the user can easily visually recognize a problem, and thus the validity of the prediction model can be evaluated more comprehensively.

In the machine learning program verification apparatus in the present embodiment, the calculation device may further: (i) create the violation range designation logical expression indicating that the value of the explanatory variable that appears in the path logical expression is included in the violation range, (ii) create the violation range designation path logical expression by logically combining the violation range designation logical expression with the path logical expression, (iii) obtain the satisfiability determination result of the violation range designation path logical expression by inputting the violation range designation path logical expression to the satisfiability determiner, and when the satisfiability determination result indicates satisfaction, obtain the corresponding decision tree path as the violation path, and (iv) display the decision tree as the decision tree graph on the screen, and highlight the violation path on the decision tree graph.

Accordingly, the user can more easily visually recognize the problem, and thus the validity of the prediction model can be evaluated more comprehensively.

In the machine learning program verification apparatus in the present embodiment, the calculation device may further: (i) highlighting the violation path on the decision tree graph for the violation input value or the second violation input value, and obtain, among the nodes that constitute the decision tree graph, the node in which the highlighted violation path does not branch as the non-branching node, and (ii) output the explanatory variable used in the non-branching node as the cause explanatory variable.

Accordingly, the user can more easily visually recognize the problem, and thus the validity of the prediction model can be evaluated more comprehensively.

In the machine learning program verification apparatus in the present embodiment, the calculation device may further, when the value of the explanatory variable is received by the input device as the input value for the program and the value of the explanatory variable is not included in any of the violation ranges, generate the source code of the input filter program for transmitting the input value to the program.

Accordingly, it is possible to prevent the machine learning model from being executed if the input value is within the violation range, and thus the validity of the prediction model can be evaluated more comprehensively.

In the machine learning program verification apparatus in the present embodiment, the storage device may stores the data set including the set of the value of the explanatory variable and the value of the objective variable and used when the program is created by the machine learning, and during the creation of the combined logical expression, the calculation device may (i) obtain the maximum value and the minimum value of the explanatory variable by referring to the data set, (ii) create the explanatory variable range limit logical expression indicating that the value of the explanatory variable is equal to or smaller than the maximum value and equal to or larger than the minimum value, and (iii) create the combined logical expression by logically combining the explanatory variable range limit logical expression with the decision tree logical expression, the verification property logical expression, and the objective variable calculation logical expression.

Accordingly, the violation range search is more efficient and accurate, and thus the validity of the prediction model can be evaluated more comprehensively.

In the machine learning program verification apparatus in the present embodiment, the storage device may store the data set including the set of the value of the explanatory variable and the value of the objective variable and used when the program is created by the machine learning, and during specifying of the search range, the calculation device may (i) obtain the maximum value and the minimum value of the explanatory variable by referring to the data set and apply a predetermined rule to the maximum value or the minimum value, and (ii) calculate the unit value to be added to or subtracted from the search target violation input value during the creation of the upper limit value and the lower limit value.

Accordingly, the violation range search is more efficient and accurate, and thus the validity of the prediction model can be evaluated more comprehensively.

In the machine learning program verification apparatus in the present embodiment, the calculation device may change, based on the number of times the addition or the subtraction is performed during a predetermined period, the unit value to be added to or subtracted from the search target violation input value in accordance with a predetermined rule.

Accordingly, the violation range search can be made more efficient in accordance with the situation, and thus the validity of the prediction model can be evaluated more comprehensively.

In the machine learning program verification apparatus in the present embodiment, when the satisfiability determination result of the second combined logical expression or the third combined logical expression indicates unsatisfiability, the calculation device may further: (i) store the range included in the search range of the search target explanatory variable and the limit range of the non-search target explanatory variable, (ii) divide the multi-dimensional space of the input values representing the violation ranges by the first hyperplane that passes through the upper limit value of the search range of the search target explanatory variable and that takes a basis vector of the search target explanatory variable as the normal vector, the second hyperplane that passes through the lower limit value of the search range of the search target explanatory variable and that takes a basis vector of the search target explanatory variable as the normal vector, the third hyperplane that passes through the upper limit value of the limit range of the non-search target explanatory variable and that takes a basis vector of the non-search target explanatory variable as the normal vector, and the fourth hyperplane that passes through the lower limit value of the limit range of the non-search target explanatory variable and that takes a basis vector of the non-search target explanatory variable as the normal vector, (iii) specify, among the divided spaces obtained by the division, the space surrounded by the first hyperplane, the third hyperplane, and the fourth hyperplane as the reconfirmation space, and create the reconfirmation space logical expression meaning that the input value is included in the reconfirmation space, (iv) create the fifth combined logical expression by logically combining the reconfirmation space logical expression with the combined logical expression, (v) obtain the satisfiability determination result of the fifth combined logical expression by inputting the fifth combined logical expression to the satisfiability determiner, (vi) when the satisfiability determination result indicates satisfaction, specifying, as the violation range, the plurality of multi-dimensional spaces obtained by removing the space surrounded by the first hyperplane, the second hyperplane, the third hyperplane, and the fourth hyperplane from the divided spaces, and (vii) when the satisfiability determination result indicates unsatisfiability, specify, as the violation range, the plurality of multi-dimensional spaces obtained by removing the reconfirmation space and the space surrounded by the first hyperplane, the second hyperplane, the third hyperplane, and the fourth hyperplane from the divided spaces.

Accordingly, even when the violation range is large initially, the violation range can be subdivided appropriately, and thus the validity of the prediction model can be evaluated more comprehensively.

What is claimed is:

1. A machine learning program verification apparatus comprising:
   a storage device in which a program is stored, the program being created by machine learning, in which a value of an objective variable is output with a value of an explanatory variable as an input, in accordance with a prediction algorithm based on an ensemble tree including a plurality of decision trees that constitute the program; and
   a calculation hardware device configured to:
      create a decision tree logical expression by logically combining path logical expressions indicating decision tree paths in the decision trees for the program,
      create a combined logical expression by logically combining a verification property logical expression and an objective variable calculation logical expression with the decision tree logical expression, the verification property logical expression indicating a verification property to be verified for the program, and the objective variable calculation logical expression defining a relationship between a decision tree output value of each decision tree and the value of the objective variable,
      obtain a satisfiability determination result of the combined logical expression by inputting the combined logical expression to a predetermined satisfiability determiner, and determine, based on the satisfiability determination result, whether the program satisfies the verification property, and
      when a result of the determination indicates satisfaction, obtain, from a satisfaction solution indicated by the satisfiability determiner, a first violation input value that is the value of the explanatory variable that violates the verification property and a first violation output value that is the value of the objective variable corresponding to the first violation input value, obtain a corresponding decision tree path of the combined logical expression as a violation path, display the corresponding decision tree path as a decision tree graph on a screen, and highlight the violation path on the decision tree graph.

2. The machine learning program verification apparatus according to claim 1, wherein
the calculation hardware device is configured to:
during the creation of the decision tree logical expression, extract a decision tree path from the decision trees and create a path logical expression including a path condition of the extracted decision tree path, and
during the creation of the verification property logical expression, receive, by an input device, a user input of the verification property defined as a relationship between the explanatory variable and the objective variable, and create the verification property logical expression based on the received verification property.

3. The machine learning program verification apparatus according to claim 2, wherein
the calculation hardware device is further configured to:
when the satisfiability determination result indicates satisfaction, classify the explanatory variable into a search target explanatory variable and a non-search target explanatory variable based on a predetermined rule or user designation,
for a search target violation input value that is a value of the search target explanatory variable and that constitutes the first violation input value and a non-search target violation input value that is a value of the non-search target explanatory variable and that constitutes the first violation input value, create an upper limit value and a lower limit value of the search target explanatory variable to include the search target violation input value, and specify a range equal to or smaller than the upper limit value and equal to or larger than the lower limit value as a search range of the search target explanatory variable,
create a search range logical expression meaning that the value of the search target explanatory variable is within the search range,
set the non-search target violation input value of the non-search target explanatory variable as a limit range of the non-search target explanatory variable, and create a limit range logical expression meaning that the value of the non-search target explanatory variable is within the limit range,
create a second combined logical expression by logically combining the search range logical expression and the limit range logical expression with the combined logical expression, and
obtain a satisfiability determination result of the second combined logical expression by inputting the second combined logical expression to the satisfiability determiner, and when the satisfiability determination result indicates satisfaction, specify a range equal to or smaller than the upper limit value and equal to or larger than the lower limit value as a violation range of the search target explanatory variable.

4. The machine learning program verification apparatus according to claim 3, wherein
the calculation hardware device is further configured to, when the satisfiability determination result of the second combined logical expression indicates satisfaction,
classify the explanatory variable into a second search target explanatory variable and a second non-search target explanatory variable based on a predetermined rule or user designation,
when a violation range has been created for the second search target explanatory variable, create an upper limit value and a lower limit value of the second search target explanatory variable such that the violation range is included,
set a range that is equal to or smaller than the upper limit value and equal to or larger than the lower limit value and does not include the violation range as a search range of the second search target explanatory variable, and create a search range logical expression meaning that a value of the second search target explanatory variable is within the search range,
when a violation range has been created for the second non-search target explanatory variable, set the violation range as a limit range of the second non-search target explanatory variable, and create a limit range logical expression meaning that a value of the second non-search target explanatory variable is within the limit range,
create a third combined logical expression by logically combining the search range logical expression and the limit range logical expression with the combined logical expression, and
obtain a satisfiability determination result of the third combined logical expression by inputting the third combined logical expression to the satisfiability determiner, and when the satisfiability determination result indicates satisfaction, specify a range equal to or smaller than the upper limit value and equal to or lamer than the lower limit value as a violation range of the second search target explanatory variable.

5. The machine learning program verification apparatus according to claim 4, wherein
the calculation hardware device is configured to, when the satisfiability determination result of the second combined logical expression or the third combined logical expression indicates unsatisfiability, obtain the explanatory variable and is further configured to:
when a violation range has been set for the explanatory variable, create a premise range designation logical expression meaning that the value of the explanatory variable is outside the violation range,
when no violation range has been set for the explanatory variable, create the premise range designation logical expression meaning that the value of the explanatory variable is equal to the first violation input value,
create a fourth combined logical expression by combining the premise range designation logical expression with the combined logical expression, and
obtain a satisfiability determination result of the fourth combined logical expression by inputting the fourth combined logical expression to the satisfiability determiner, and when the satisfiability determination result indicates satisfaction, obtain a satisfaction solution thereof from the satisfiability determiner, and obtain, from the satisfaction solution, a fourth violation input value that is a value of an explanatory variable that violates the verification property and a violation output value that is a value of an objective variable corresponding to the fourth violation input value.

6. The machine learning program verification apparatus according to claim 4, wherein
the calculation hardware device is configured to, when the satisfiability determination result of the second combined logical expression or the third combined logical expression indicates satisfaction, obtain the satisfaction solution, and is further configured to:
obtain, from the satisfaction solution, a third violation input value that is a value of an explanatory variable that violates the verification property and a violation output value that is a value of an objective variable corresponding to the third violation input value.

7. The machine learning program verification apparatus according to claim 4, wherein
the calculation hardware device is further configured to:
create a violation input value designation logical expression meaning that a value of an explanatory variable that appears in the path logical expression matches the first violation input value or a second violation input value,
create a violation input value-designated path logical expression by logically combining the violation input value designation logical expression with the path logical expression,
obtain a second satisfiability determination result of the violation input value-designated path logical expression by inputting the violation input value-designated path logical expression to the satisfiability determiner, and when the second satisfiability determination result indicates satisfaction, obtain a second corresponding decision tree path as a second violation path, and
display the second decision tree path as a second decision tree graph on a screen, and highlight the second violation path on the second decision tree graph.

8. The machine learning program verification apparatus according to claim 3, wherein
the calculation hardware device is further configured to:
create a violation range designation logical expression indicating that the value of the explanatory variable that appears in the path logical expression is included in the violation range,
create a violation range designation path logical expression by logically combining the violation range designation logical expression with the path logical expression,
obtain a second satisfiability determination result of the violation range designation path logical expression by inputting the violation range designation path logical expression to the satisfiability determiner, and when the second satisfiability determination result indicates satisfaction, obtain a second corresponding decision tree path as a second violation path, and
display the second decision tree path as a second decision tree graph on a screen, and highlight the second violation path on the second decision tree graph.

9. The machine learning program verification apparatus according to claim 7, wherein
the calculation hardware device is further configured to:
highlight the second violation path on the decision tree graph for the first violation input value or the second violation input value, and obtain, among nodes that constitute the second decision tree graph, a node in which the highlighted second violation path does not branch as a non-branching node, and
output an explanatory variable used in the non-branching node as a cause explanatory variable.

10. The machine learning program verification apparatus according to claim 1, wherein
The calculation hardware device is further configured to, when the value of the explanatory variable is received by an input device as an input value for the program and the value of the explanatory variable is not included in any of violation ranges, generate a source code of an input filter program for transmitting the input value to the program.

11. The machine learning program verification apparatus according to claim 1, wherein
the storage device stores a data set including a set of the value of the explanatory variable, and the value, of the objective variable and used when the program is created by machine learning, and
the calculation hardware device is configured to, during the creation of the combined logical expression, obtain a maximum value and a minimum value of the explanatory variable by referring to the data set, create an explanatory variable range limit logical expression indicating that the value of the explanatory variable is equal to or smaller than the maximum value and equal to or larger than the minimum value, and create the combined logical expression by logically combining the explanatory variable range limit logical expression with the decision tree logical expression, the verification property logical expression, and the objective variable calculation logical expression.

12. The machine learning program verification apparatus according to claim 3, wherein
the storage device stores a data set including a set of the value of the explanatory variable and the value of the objective variable and used when the program is created by machine learning, and
the calculation hardware device is configured to, during specifying of the search range, obtain a maximum value and a minimum value of the explanatory variable by referring to the data set, apply a predetermined rule to the maximum value or the minimum value, and calculate a unit value to be added to or subtracted from the search target violation input value during the creation of the upper limit value and the lower limit value.

13. The machine learning program verification apparatus according to claim 12, wherein
the calculation hardware device is configured to change, based on the number of times the addition or the subtraction is performed during a predetermined period, the unit value to be added to or subtracted from the search target violation input value in accordance with a predetermined rule.

14. The machine learning program verification apparatus according to claim 4, wherein
the calculation hardware device is further configured to, when the satisfiability determination result of the second combined logical expression or the third combined logical expression indicates unsatisfiability,
store a range included in the search range of the search target explanatory variable and the limit range of the non-search target explanatory variable,
divide a multi-dimensional space of input values representing the violation ranges by a first hyperplane that passes through an upper limit value of the search range of the search target explanatory variable and that takes a basis vector of the search target explanatory variable as a normal vector, a second hyperplane that passes through a lower limit value of the search range of the search target explanatory variable and that takes a basis vector of the search target explanatory variable as a normal vector, a third hyperplane that passes through an upper limit value of the limit range of the non-search target explanatory variable and that takes a basis vector of the non-search target explanatory variable as a normal vector, and a fourth hyperplane that passes through a lower limit value of the limit range of the non-search target explanatory variable and that takes a basis vector of the non-search target explanatory variable as a normal vector, specify, among divided spaces obtained by the division, a space surrounded by the first hyperplane, the third hyperplane, and the fourth hyperplane as a reconfirmation space, and create a reconfirmation space logical expression meaning that an input value is included in the reconfirmation space, create a fifth combined logical expression by logically combining the reconfirmation space logical expression with the combined logical expression, obtain a fourth satisfiability determination result of the fifth combined logical expression by inputting the fifth combined logical expression to the satisfiability determiner, when the fourth satisfiability determination result indicates satisfaction, specify, as a violation range, a plurality of multi-dimensional spaces obtained by removing a space surrounded by the first hyperplane, the second hyperplane, the third hyperplane, and the fourth hyperplane from the divided spaces, and when the fourth satisfiability determination result indicates unsatisfiability, specify, as a violation range, a plurality of multi-dimensional spaces obtained by removing the reconfirmation space and the space surrounded by the first hyperplane, the second hyperplane, the third hyperplane, and the fourth hyperplane from the divided spaces.

15. A machine learning program verification method to be executed by an information processing apparatus including a storage device in which a program is stored, the program being created by machine learning, in which a value of an objective variable is output with a value of an explanatory variable as an input, in accordance with a prediction algorithm based on an ensemble tree including a plurality of decision trees, the method comprising:

creating a decision tree logical expression by logically combining path logical expressions indicating decision tree paths in the decision trees for the program created by machine learning;

creating a combined logical expression by logically combining a verification property logical expression and an objective variable calculation logical expression with the decision tree logical expression, the verification property logical expression indicating a verification property to be verified for the program, and the objective variable calculation logical expression defining a relationship between a decision tree output value of each decision tree and the value of the objective variable;

obtaining a satisfiability determination result of the combined logical expression by inputting the combined logical expression to a predetermined satisfiability determiner, and determining, based on the satisfiability determination result, whether the program satisfies the verification property, and when a result of the determination indicates satisfaction, obtaining, from a satisfaction solution indicated by the satisfiability determiner, a first violation input value that is the value of the explanatory variable that violates the verification property and a violation output value that is the value of the objective variable corresponding to the first violation input value, obtaining a corresponding decision tree path of the combined logical expression as a violation path, displaying the corresponding decision tree path as a decision tree graph on a screen, and highlighting the violation path on the decision tree graph.

\* \* \* \* \*